US006408263B1

(12) United States Patent
Summers

(10) Patent No.: US 6,408,263 B1
(45) Date of Patent: Jun. 18, 2002

(54) MANAGEMENT TRAINING SIMULATION METHOD AND SYSTEM

(76) Inventor: Gary J. Summers, 8 Pine Dr., Port Washington, NY (US) 11050

( * ) Notice: Subject to any disclaimer, the term of this patent is extended or adjusted under 35 U.S.C. 154(b) by 0 days.

(21) Appl. No.: 09/364,280

(22) Filed: Jul. 30, 1999

Related U.S. Application Data

(60) Provisional application No. 60/094,900, filed on Jul. 31, 1998, and provisional application No. 60/141,738, filed on Jun. 30, 1999.

(51) Int. Cl.$^7$ .......................... G05B 17/00; G06F 17/60
(52) U.S. Cl. ................................ 703/6; 703/2; 705/10; 434/107
(58) Field of Search ............................ 703/6, 2; 705/7, 705/10; 434/107

(56) References Cited

U.S. PATENT DOCUMENTS

| | | | | |
|---|---|---|---|---|
| 5,041,972 | A | | 8/1991 | Frost ............................ 705/10 |
| 5,056,792 | A | | 10/1991 | Helweg-Larsen et al. ... 273/278 |
| 5,240,419 | A | | 8/1993 | deGyarfas ................... 434/322 |
| 5,326,270 | A | | 7/1994 | Ostby et al. ................. 434/362 |
| 5,574,889 | A | * | 11/1996 | Jindo et al. ..................... 703/1 |
| 5,737,581 | A | | 4/1998 | Keane ............................ 703/6 |
| 5,887,154 | A | | 3/1999 | Iwasa et al. .................... 703/6 |
| 5,974,246 | A | * | 10/1999 | Nakazawa ...................... 703/2 |

OTHER PUBLICATIONS

Campbell, T.L. Optimal Decision Making in a Complex Business Simulation, IEEE proc. Of 22$^{nd}$ Annual Hawaii int'l. Conf. On System Sciences, Jan. 1989. vol. 3. pp. 822–831.
Capitalism [online]. Games Domain Review, 1996 [retrieved on Sep. 30, 1999].
Business Simulation [online]. Strategic Management Group, Inc. 1999 [ret. Sep. 30, 1999].
Powerism Constructor 2.5 [online]. Vison Works 1999 [ret. Sep. 30, 1999].
Powerism [online] Powerism 1998 [retrieved on Sep. 30, 1999].
Capitalism Product Description [online]. Interactive Magic, 1996 [ret. On Sep. 30, 1999].
Robyn M. Dawes, Rational Choice In An Uncertain World, §§2.1–2.3 (pp. 23–31), §6.5 (pp. 121–125), and §§7.1–7.8 (pp. 128–143), plus cover and abstract (1988).

(List continued on next page.)

*Primary Examiner*—Kyle J. Choi
(74) *Attorney, Agent, or Firm*—Darby & Darby

(57) ABSTRACT

A management training simulation system and method are disclosed. A method in accordance with one aspect of the invention is implemented on a computer and represents changes in design opportunities for objects in a simulated environment. The design opportunities can represent, for example, new or changed features in a product made by a particular firm. The objects are defined through an attribute-characteristic representation. A multipeaked value function is used to process designs throughout the simulation instead of a distance-value function as in conventional simulations. At some time during the simulation, the domain of one or more attributes, the number of attributes, or both are changed to thereby alter the set of valid designs for the objects in the simulation. Such changes can simulate technological advances including incremental and radical innovations, government regulation, shortages in raw materials, union strikes, and the like. Participants in the simulation acquire limited information concerning the marketplace to guide their going-forward decisions, preferably at a cost. In a further aspect of the invention, the participants actions are monitored and the performance of each participant is gauged against predetermined criteria. A network preferably interconnects plural simulation participants to a central computer which runs the simulation.

19 Claims, 21 Drawing Sheets

A Process Flow for Developng the Decision-Making Skills of a User or for Representing Changes in Design Opportunities

OTHER PUBLICATIONS

Richard R. Nelson, "The Role of Knowledge In R&D Efficiency," in The Quarterly J. of Econ, pp. 453–470 (1982).

Volker Nissen, Management Applications and Other Classical Optimization Problems, in Handbook of Evolutionary Computation, Thomas Bäck et al., ed., §F1.2, pp. F1.2:1–50 plus cover (1997).

Jose Lobo et al., "Landscapes: A Natural Extension of Search Theory," from Santa Fe Inst. Website, pp. 1–33 plus abstract and cover (1999).

Stuart Kauffman et al., "Optimal Search on a Technology Landscape," from Santa Fe Inst. Website, pp. 2–40 plus abstract and table of contents (1998).

Gary J. Summers, "Modeling Industry Life Cycles for Behavioral Research in Management and Economics," from Social Science Research Network Website (www.ssrn.com) pp. 1–44 plus abstract.

Philip Auerswald et al., "The Production Recipes Approach to Modeling Technological Innovation: An Application to Learning by Doing," from Santa Fe Inst. Website, pp. 1–42 plus Tables 1–10, Figs. 1–24, cover and abstract (1998).

Daniel Kahneman et al., "Calibration of Probabilities: The State of the Art," in Judgment Under Uncertainty: Heuristics and Biases, Chapter 22, pp. 306–334 plus cover (1982).

Bernard Manerick, et al., "The Genetic Algorithm and the Structure of the Fitness Landscape," in Proc. of the 4th Intl Conf. on Genetic Algorithms, Belew and Bookes, eds. pp. 143 . 150 (San Mateo, California: Morgan Kauffmann Publishers, 1991).

Marc Lipsitch, "Adaptation on Rugged Landscapes Generated by Iterated Local Interactions of Neighboring Genes," in Proc. of the 4th Intl Conf. on Genetic Algorithms, pp. 128 . 135.

Bernard manderick, "Correlation Analysis," in Handbook of Evolutionary Computation, §B2.7.3, pp. B2.7:10–14 plus cover (New York: Oxford University Press, 1997).

Thomas Back, Evolutionary Algorithms in Theory and Practice, §3.4, pp. 143–44 and cover (New York: Oxford University Press, 1996).

Alden Wright, "Genetic Algorithms for Real Parameter Optimization," in Foundations of Genetic Algorithms, Gregory Rawlins, ed., pp. 205–18 (San Mateo, California: Morgan Kauffman Publishers, 1991).

Kate Juliff,"The Packing Problem,"in Handbook of Evolutionary Computation, Thomas Bäck et al., ed., §F1.7, pp. F1.7:1–5 plus cover (1997).

Ralf Bruns, "Scheduling," in Handbook of Evolutionary Computation, Thomas Bäck et al., ed., §F1.5, pp. F1.7:1–9 plus cover (1997).

Darrell Whitley, "Permutations," in Handbook of Evolutionary Computation, Thomas Bäck et al., ed., §C1.4, pp. C1.4:1–8 plus cover (1997).

Steven Gold et al., "Modeling Market–and Firm–Level Demand Functions in Computerized Business Simulations," in Simulations and Games, vol. 15, No. 3, pp. 346–363 (Sep. 1984).

James M. Utterback, "Innovations and Industrial Evolution," in Mastering the Dynamics of Innovation—How Companies Can Seize Opportunities in Face of Technological Change, Chapter 4, pp. 79–102 plus cover (1994).

Peter Drucker, "Entrepreneurial Management," in Innovation and Entrepreneurship—Practice and Principles, Chapter 12, pp. 143–176 (New York Harper & Row, 1985).

Peter Drucker, "The Innovative Organization," in Management: Tasks, Responsibilities, Practices, Chapter 61, pp. 782–803 (New York: Harper Collins, 1973).

James Brian Quinn, "Managing Innovation: Controlled Chaos," in Harvard Business Review, pp. 73–84 (May–Jun. 1985).

Donald Frey, "The New Dynamism (Part 1)," in Interfaces, vol. 24, No. 2, pp. 87–91 (Mar.–Apr. 1994).

Lowell W. Steele, "Nurturing Innovation," in Managing Technology: The Strategic View, Chapter 11, pp. 263–288 (New York: McGraw–Hill, 1989).

Dennis Jennings, et al., "Informal Convariation Assessment: Data–Based versus Theory–Based Judgments," in Judgment Under Uncertainty: Heuristics and Biases, Chapter 15, pp. 211–230 (New York: Cambridge University Press, 1982).

Thomas F. Pray et al., "Modeling Radical Changes in Technology Within Strategy–Oriented Business Simulations," in Simulation and Gaming, vol. 22, No. 1, pp. 19–35 (Mar. 1991).

Richard D. Teach, "Demand Equations for Business Simulations With Market Segments," in Simulation and Gaming, vol. 21, No. 4, pp. 423–442, (Dec. 1990).

Steven C. Gold et al., "Technological Change and Intertemporal Movements in Consumer Preferences in the Design of Computerized Business Simulations with Market Segmentation," in Developments in Business Simulation and Experimental Learning, Nancy H. Leonard and Sandra W. Morgan, eds., vol. 25, pp. 156–167 (1998).

Steven Gold and Thomas Pray, "The Production Frontier: Modeling Production in Computerized Business Simulations," in Simulation and Games, vol. 20, No. 3, pp. 300–318 (Sep. 1989).

Precha Thavikulwat, "Modeling the Human Component in Computer–Based Business Simulations," in Simulation and Gaming, vol. 22, No. 3, pp. 350–359 (Sep. 1991).

Steven C. Gold, "Modeling Short–Run Cost and Production Functions in Computerized Business Simulations," in Simulation and Gaming, vol. 23, No. 4, pp. 417–430 (Dec. 1992).

Precha Thavikulwat, "Product Quality in Computerized Business Simulations," in Simulation and Gaming, vol. 23, No. 4, pp. 431–441 (Dec. 1992).

Steven C. Gold et al., "Modeling Demand in Computerized Business Simulations," in Guide to Business Gaming and Experiential Learning, Association for Business Simulation and Experiential Learning, Jim W. Gentry, ed., Chapter 8, pp. 117–138 plus cover (East Brunswick: Nichols/GP Publishing, 1990).

Gary J. Summers, "Analyzing Managers' Judgments and Decisions with an Educational Business Simulation," in Developments in Business Simulation and Experiential Learning, Sandra Morgan and Diana Page, eds., vol. 26, pp. 58–64 plus cover (1999).

Gary J. Summers, "Modeling Innovation as a Process of Design in Educational Business Simulations," in Developments in Business Simulation and Experiential Learning, Sandra Morgan an Diana Page, eds., vol. 26, pp. 146–152 plus cover (1999).

Stuart Kauffman et al., "Technological Evolution an Adaptive Organizations," in Complexity, vol. 1, No. 2, pp. 26–43 plus table of contents (1995).

Stuart A. Kauffman, "The Evolution of Economic Webs," in The Economy As An Evolving Complex System, Philip Anderson, Proc. of the Evolutionary Paths of the Global Econ. Workshop Held in Santa Fe, New Mexico, Kenneth Arrow and David Pines, eds., pp. 125–146 (Sep. 1987).

Richard R. Nelson et al., "Further Analysis of Search and Selection," in An Evolutionary Theory of Economic Change, Chapter 11 (Introduction and Part 1), pp. 246–262 plus cover (1982).

Gary J. Simmons, "Industrial Dynamics: An Evolutionary Model for an Interactive Simulation," from Dissertation Submitted to the Graduate School of Northwestern University, pp. 1–166 (Jun. 1997).

Stuart Kauffman, "The Structure of Rugged Fitness Landscapes," in The Origins of Order: Self–Organization and Selection in Evolution, Chapter 2, pp. 33–67 (New: York Oxford University Press, 1993).

Manual—Capitalism Plus—Chapter 5–Marketing pp. 5–1 through 5–12.

* cited by examiner $A_{two}=x_1$ $A_{two}=x_2$

Attribute One

|   | A | B | C | D |
|---|---|---|---|---|
| A | 5 | 4 | 10 | 1 |
| B | 8 | 6 | 3 | 4 |
| C | 7 | 1 | 5 | 12 |
| D | 2 | 9 | 6 | 2 |

Attribute Two

FIG. 5

| Column | 1 | 2 | 3 | 4 | // | 9 | 10 | 11 | 12 | 13 |
|---|---|---|---|---|---|---|---|---|---|---|
| | | | | Product Characteristics | | | | | Firm | Units Sold |
| Period | | | | | | | | | | |
| 1 | | Q | W | E | // | I | O | P | 2 | 35 |
| 1 | | A | S | D | // | K | L | L | 2 | 28 |
| 1 | | Q | W | E | // | B | N | T | 2 | 3 |
| 1 | | X | Y | Z | // | H | F | V | 2 | 2 |

FIG. 11

Success in the Marketplace

|  | | Yes | No |
|---|---|---|---|
| Member of Product Class {XYZ#######} | Yes | 5 | 20 |
| | No | 40 | 400 |

Covariation Contingency Table

FIG. 15

A Hardware Arrangement for the Present Invention

A Process Flow for Evaluating a Student's Design

A Process Flow for Developng the Decision-Making Skills of a User or for Representing Changes in Design Opportunities

A Form For Providing Search Queries

| Column 1 | 2 | 3 | 4 | 5 | | 10 | 11 | 12 | 13 | 14 |
|---|---|---|---|---|---|---|---|---|---|---|
| Filter | Period | | | Product Characteristics | | | | | Firm | Units Sold |
| 1 | | Q | W | E | // | # | # | # | | |
| 2 | | | | | // | | | | | >10 |

SUBMIT

FIG. 23

MANAGEMENT TRAINING SIMULATION METHOD AND SYSTEM

This application claims priority pursuant to 35 U.S.C. Sectional 19 based upon United States Provisional Application Serial No. 60/094,900, filed Jul. 31, 1998, and 60/141,738, filed Jun. 30, 1999, the disclosures of which are hereby incorporated by reference in their entireties as if set forth herein.

FIELD OF INVENTION

The present invention relates generally to management training simulations (MTSs), which are computer programs or board games that help managers learn to manage and to understand business. More particularly, the present invention involves a computerized management training method and system that effectively teaches the development and use of knowledge and provides training in managing strategy, risk, innovation, and core competencies, as well as analyzing and correcting a manager's decision making processes and identifying a manager's unique judgmental biases and errors. It provides tailored, individualized training in managerial judgment and decision making.

BACKGROUND OF THE INVENTION

MTSs are computer simulations that teach managers how to make better informed decisions. They present a manager with a lifelike situation simulated by a computer. The manager endeavors to improve the situation. To do this, he analyzes the situation and responds with a decision. Using the model, the computer then calculates and displays the consequences of his decision. If the simulation closely approximates realistic situations, the manager learns how to confront those situations when they arise in the work environment.

MTSs are also called business simulations, business gaming, and business war games. Many business schools, corporate universities, consulting firms, training firms, and human resource departments use MTSs to teach a wide variety of subjects including marketing, finance, accounting, business strategy, supply chain management, and organization design.

There is a great need for this educational technology. People learn best from practical, hands on experience. Yet the primary source of such experience, one's business, is a difficult place in which to learn. Business experiments are not repeatable, decision consequences represent the outcomes of many influences, and the penalties for failure are potentially high. Business risks, costs, and complexity prevent a manager from engaging in the playful, mistake driven experimentation through which people learn best.

The predominant alternative to learning 'on the job' are books and classroom study. These methods are also limited. Applying intellectual knowledge to practice is extremely difficult. For example, no medical student is expected to move directly from Gray's Anatomy to surgery.

MTSs overcome the problems of learning 'on the job' and of classroom study. They are the ideal means for learning: experiments are repeatable while consequences are discernable and immediate. They condense years of experience into a few hours of study, thereby improving the learning that managers gain from their most limited resource—time. MTSs bridge the distance between intellectual understanding and practice (as cadavers do for medical students). They facilitate practical learning without risking "the patient"—one's career and company.

A manager will gain the following benefits by using MTSs to improve his management skill:

One can test his own strategies and intuitions—the student directs the lesson, rather than the lesson directing the student (as in traditional classroom learning).

MTSs provide more realistic exercises than those found in books or lectures, while still being less complex than real life situations.

MTSs can isolate critical skills. Managers can concentrate on improving these skills without being encumbered by the complexity of the real task.

The consequences of one's actions appear immediately and are easily discerned.

Unlike in one's actual job, there is no penalty for failure. One can experiment risk free.

MTSs facilitate testing ideas before real life implementation (called "what if" experiments).

MTSs increase communication by instigating discussion of strategy and operations and by illuminating business concerns.

FIG. 1 shows a most general architecture of an MTS. An MTS is composed of four parts: a display for presenting information about a simulated business situation (103); an input device for a person or team learning with the MTS (hereafter called a student) to input decisions into the MTS (104); a simulation of a business situation (101); and a business simulation manipulator (102) for calculating and producing the effects of students' decisions on the business situation. The arrows in FIG. 1 represent the movement of information and decisions in the MTS. The movement of information and decisions is best explained by describing the operation of an MTS. This is as follows: The display gathers information from the simulated business situations and displays this information for the students. After witnessing the information, the students make decisions. The students enter their decisions into the business situation via an input device. Upon receiving the students' decisions, the business simulation manipulator calculates the effects of the students' decisions in the simulated business situation. Information from the affected business situation is then displayed for the students.

An important class of MTS within the general MTS architecture depicted in FIG. 1 is the competitive industry MTS. In such MTSs the simulated business situation comprises a simulation of a competitive marketplace. Competitive industry MTSs teach the management of business functions where markets influence business results; for example, marketing, finance, and business strategy. For simplicity, I refer to competitive industry MTSs as MTSs and refer to the general case depicted in FIG. 1 as the 'general case' MTS.

FIG. 2 shows the architecture of an MTS. The simulated business situation is a competitive industry. The simulated competitive industry is composed of at least two types of components: a marketplace model (201) and at least one firm (204) controlled by a student. The marketplace model simulates, among other things, products, customers, market segments, and technology (described below). The marketplace model influences the structure and dynamics of the simulated competitive industry. Each student manages a separate firm. Through their respective firms, students compete against each other for profits and market share in the marketplace. Each firm has several characteristics relating to business processes (for example, manufacturing capacity, the number of salespeople, operating capital, debt, and accounts receivable). The marketplace model and firm model determine the decisions required of students and the lessons learned. Depending upon the characteristics of the simulated marketplace and the simulated firms, MTSs might require that managers compete in several markets and/or manage one or more of several business functions (for example, finance, marketing, sales, customer service, and research and development).

To manage their firm and, specifically, to receive information and input decisions, students use an interface (205). This interface is typically an integration of the display and input devices shown in FIG. 1. However, some business simulations are played as board games (for an example see U.S. Pat. No. 5,056,792). In such board games, the firm model and market models are comprised of a visual display on the game board and a set of rules governing play and hence the display on the board. For example, a portion of the game board might represent firms. Chips placed on this portion of the board represent the firm's characteristics, such as the amount of inventory. Rules determine when chips are added or removed from the board. Another portion of the board represents the marketplace in a similar manner. When an MTS is played as a board game, the interface is the game board itself. Making this distinction, one versed in the art will recognize that the general descriptions of MTS given throughout this document apply to both board games and computer simulation MTSs.

The arrows in FIG. 2 represent the movement of information, revenues, and decisions in the MTS. The movement of these objects is most clearly explained by describing the operation of an MTS.

Each application of an MTS is called a learning session. A learning session progresses through rounds where each round consists of the following sequenced steps:

1. Each interface collects information describing its student's firm and the marketplace. The firm's characteristics constitute the information describing the student's firm. Information about the marketplace might include, for example, the products previously sent to the marketplace, the prices offered, sales volumes, and competitors' market shares. Each interface displays this information to its student.
2. Using the information presented by the interface, each student determines his firm's decisions for the current round. These decisions might include, for example, pricing products, purchasing manufacturing capacity, and producing products.
3. With an input means (for example, a keyboard or mouse) each student enters his decisions into the interface. The interface sends these decisions to the student's firm.
4. Each student's firm implements its student's decisions. The produced products are sent to the marketplace.
5. Having received the production from all the firms, the marketplace simulates the sale of all firms' products. This simulation might include, for example, evaluating firms' products and calculating demand. For these tasks, the marketplace model will contain a product evaluator (FIG. 2, field 203) for evaluating products and a market manipulator for calculating demand (FIG. 2, field 202). After the sales are determined, the sales' revenues are sent to the appropriate firm. After completing these five steps a round is complete. The next round begins with step one.

The following description focuses upon marketplace models and product design to facilitate the discussion of MTSs in general. MTSs require a marketplace model which represents both products and markets. MTSs also require students to perform three tasks: (1) analyze the marketplace and competing firms, (2) design products and set prices, and (3) invest in business processes. The following describes how MTSs' represent products and markets and how they supply the structure required to facilitate the students' performance of their required tasks.

Products

Products in known MTSs generally include three types of product traits: business process traits, aggregate traits, and attributes. Business process traits represent the outcome of business processes, such as customer service level and delivery delays. Aggregate traits describe the whole product, such as product quality and product reliability. Attributes represent specific features comprising a product. Attributes can vary quantitatively (for example, amount of calories in one serving of a breakfast cereal) or qualitatively (for example, a product's color). The values that attributes can express are called characteristics. The set of characteristics that an attribute can express is referred to as the attribute's domain. The composite produced by the characteristics expressed by a product's attributes is called a product's design.

Product Classes

A product class is the set of products consisting of all the possible values for a product vector. Real world examples of product classes are sports cars and long distance phone service. A specific product is identified by its class and its traits. For example, suppose sports cars have three traits: customer service, delivery delay, and product quality. Suppose also that customer service and product quality are measured with a ten point scale. A specific product in the sports car product class is a sports car with a level five customer service, two week delivery delay, and a level seven quality.

To provide more realistic decision situations, some MTSs furnish several product classes, for example sports cars and luxury cars. Multiple product classes are defined by declaring their existence. For example, an MTS might declare three classes of products (classes A, B, C) by declaring three types of product vectors of the type described above. Each product class can have the same traits, but this is not necessary.

Markets

Demand for products is simulated in prior art MTSs using a demand function for a market manipulator (FIG. 2, field 202). In most MTSs, the market manipulator is a set of equations. For examples see: Steven Gold and Thomas Pray, "Modeling Demand in Computerized Business Simulations," in Jim W. Gentry (ed.), *Guide to Business Gaming and Experiential Learning,* Association for Business Simulation and Experiential Learning (East Brunswick: Nichols/GP Publishing, 1990), pp. 117—138. The market manipulator takes the firms' production as input and calculates the total size of the market and the share of demand for each firm. This demand is then compared to firms' actual production to determine sales. When equations are used, the parameters of the equations permit an MTS designer to adjust the industry and firm specific demand elasticities for each product trait. In addition, by using multiple sets of these equations MTSs can represent multiple market segments (for example, customers who value quality over timely delivery or vice versa) and/or multiple markets (for example, the Canadian and the United States automobile markets).

It is notable that, usually, the market manipulator does not directly receive product characteristics as inputs (as independent variables). Instead, a product's characteristics are used to produce a single number that represents a market's evaluation of a product's design. I call this number a product's value. The conversion is produced by a product evaluator (FIG. 2, field 203). In most MTSs, the product evaluator is an equation $v=h(a_1, a_2, \ldots a_n)$, where v is the value of a product, n is the number of attributes comprising products, and $a_1, a_2, \ldots a_n$ are the attributes that can express characteristics in the product. I call this equation a product value function. The product value function has the effect of removing a product's attributes from the product vector and replacing them with a single aggregate product trait: product value. The market manipulator accepts this trait as an input. As described in detail in the closing remarks below, prior art MTSs evaluate product values using a distance value function.

Management Decisions

Students are told what product classes, market segments, and markets exist and the product traits comprising the products of an MTS. With this knowledge, students control a firm and compete in the simulated marketplaces by producing products from one or more of the declared product classes.

Each student manages his firm by performing the following tasks:

1. A student studies the predefined markets and the behavior of the other firms (his competitors). From this analysis, the student develops a business strategy or adjusts his previous strategy.
2. The student enacts his strategy by selecting the characteristics expressed by product attributes, by setting prices, and by distributing his firms' operating budget among business processes (for example, manufacturing, sales, advertising, and research and development). These investments are risky. If the strategy does not produce sufficient revenues, the return on investment will be negative. The firm will lose money and go bankrupt.

The tasks of market analysis, competitor analysis, and investment in business processes are described below.

Market and Competitor Analysis

Students analyze the marketplace through three methods:

1. Students analyze the marketplace results. They identify the prices, quantities, and product traits of products sold in the marketplace. From this information they estimate the size of market segments and the value that customers gain from each product trait.
2. In some MTSs students can supplement the marketplace information by purchasing computer generated marketing surveys. These surveys describe the characteristics of the simulated market (for example, demographic statistics) or the results of simulated standard marketing tests (for example, side-by-side product comparisons or focus group tests).
3. In some MTSs students can supplement the marketplace information by purchasing marketing reports. Among other qualities, marketing reports might list products, prices, new products, products that sold well, products that sold poorly, and sales volume by product type.

Students analyze competitors using two methods:

1. By analyzing marketplace results, a student can learn the market share, production, prices, and products of competitors.
2. Some MTSs supplement this information with a computer generated 'competitive intelligence' report that details competitors' behavior. It might state, for example, the average industry investment in production capacity or in research and development.

From a student's marketing and competitor analysis, he develops a business strategy. The business strategy states a focus on specific product classes, markets, and market segments. It states the desired values of product traits, prices, and production volumes. A student enacts his strategy with three decisions: set the attribute levels, set the prices of its products, and invest in business processes. These decisions are described below.

Setting Product Attributes and Price

Students set the characteristics expressed by their products' attributes. In setting characteristics, a student determines a product's design and is essentially designing a product in the simulation. The only restrictions on product design are the domains of the attributes. For example, quantitatively varying attributes might be bounded by minimum and maximum values. Likewise, qualitatively varying attributes might present students with a limited number of characteristics to choose from. Students also select their products' prices, subject to range limitations (for example, prices must be positive numbers).

Investing in Business Processes

Students improve their product's business process traits and aggregate traits by investing in their firm's business characteristics (for example, purchasing/scraping production capacity, retooling a factory, hiring new salespeople, or purchasing more advertising). The results are determined by equations that take the firm's characteristics and the student's investment decisions as the independent variables and yield the values of business process traits.

Equations giving a firm's characteristics can affect either business processes traits or firm characteristics, such as labor productivity. For examples of the use of equations in determining business process traits and firm characteristics, see: Steven Gold and Thomas Pray, "The Production Frontier: Modeling Production in Computerized Business Simulations," *Simulation and Games,* vol. 20 (September 1989): pp. 300—318; Precha Thavikulwat, "Modeling the Human Component in Computer-Based Business Simulations," *Simulation and Gaming,* vol. 22 (September 1991): pp. 350—359; Steven Gold, "Modeling Short-Run Cost and Production Functions in Computerized Business Simulations," *Simulation and Gaming,* vol. 23 (December 1992): pp. 417—430; and Precha Thavikulwat, "Product Quality in Computerized Business Simulations," *Simulation and Gaming,* vol. 23 (December 1992): pp. 431—441.

The Closing Remarks below provide a more detailed description of the prior art of MTS and also provides a general description of the prior art methods of modeling innovation, modeling technological advance, and the prior art product value functions.

The prior art MTSs suffer from six primary deficiencies:

1. The prior method of modeling innovation only simulates the outcome of innovation (success or failure). It does not model the processes that produce the outcome. Because of this, prior art MTSs do not offer students the opportunity to experience the process of innovating or the opportunity to learn how to manage innovation.
2. Representing only the outcome of the innovation process, the prior art method of modeling innovation does not represent the role of information, knowledge, and decision making in innovation. As a result, the prior art represents the management of innovation as an investment decision (how much to invest and when) rather than as a task of producing, exploiting, and managing knowledge.

3. The prior art method for simulating technological advance only simulates a small number of new opportunities. Real technological advances create a multitude of opportunities. Because of this deficiency, prior art MTSs cannot provide students with practice in managing through technological change. Moreover, this deficiency will adversely affect an MTSs' dynamics and simulation of competitive markets.

4. Because of the value function used by prior art MTSs, prior art MTS are suitable only for teaching the management of established businesses (low uncertainty situations). These situations include, for example, pricing, designing, positioning, and promoting products in established markets (i.e., basic marketing). This limitation on their effective use arises from three consequences of the value functions that they use:

4.1. Students can choose any attribute, leave all other attributes unchanged, and increase a product's value by improving the characteristic expressed by the chosen attribute (assuming the chosen attribute is not already expressing its ideal characteristics). Because of this, a student can address each attribute independently.

4.2. By making a series of small changes in a product's design, a student can produce a sequence of designs such that (1) each subsequent design increases product value and (2) the sequence ends with the ideal product. Furthermore, this property holds regardless of the order in which a student addresses the product attributes.

4.3. The marketplace information produced by prior art MTSs is highly reliable. Information about the value of products provides a lot of information about the value of all other products.

Because of these three qualities of prior art value functions, known MTSs are not suitable for teaching the management of entrepreneurial enterprises (high uncertainty situations). These situations include, for example, developing new core competencies, developing radical innovations, managing technological change, and reinventing one's business.

5. The prior art poorly models knowledge and knowledge concepts. Because of this, known MTSs cannot usefully address the role of knowledge in a student's decisions or management of his simulated firm (such as, innovation, core competencies, and the management of risk). Neither can the prior art represent the influence of knowledge on an industry's dynamics.

6. Prior art MTSs cannot illuminate nor analyze a student's decision procedures—even though changing these procedures is their goal. Because of this, known MTSs must teach through an indirect method. With repeated simulations of a decision situation, a student tests a variety of ideas and analyzes the consequences. When the consequences differ from his expectations, he is surprised. Through iterative trial, analysis, and surprise, he learns. With this indirect method, a student learns only as well as he invents ideas and induces lessons.

The present invention improves over the prior art by creating a new modeling relationship between a product's design and its value. The consequences of this change are great. The present invention provides a superior model of innovation and technological advance, highlights the role of information and knowledge in management and in an industry's dynamics, and provides a means of explicitly representing a student's development and application of knowledge.

BRIEF DESCRIPTION OF THE DRAWINGS

The foregoing brief description, as well as other features and advantages of the present invention will be understood more completely from the following detailed description of preferred embodiments, with reference being had to the accompanying drawings, in which:

FIG. 5 depicts a multipeaked value function in a matrix representation, with the matrix entries representing the value of the function for differing combinations of two attributes;

FIG. 11 is a representation of a display of a market database;

FIG. 15 is an illustration of a covariation contingency table;

FIG. 23 illustrates a form for providing search queries of the marketplace.

RELATED WORK

Gary J. Summers, "Modeling Innovation as a Process of Design in Educational Business Simulations," in *Developments in Business Simulation and Experimental Learning,* vol. 26 (1999): pp. 146–152;

Gary J. Summers, "Analyzing Managers' Judgments and Decisions with an Educational Business Simulation," in *Developments in Business Simulation and Experimental Learning,* vol. 26 (1999): pp. 58–64.

DETAILED DESCRIPTION OF THE PREFERRED EMBODIMENT

Figure 1:
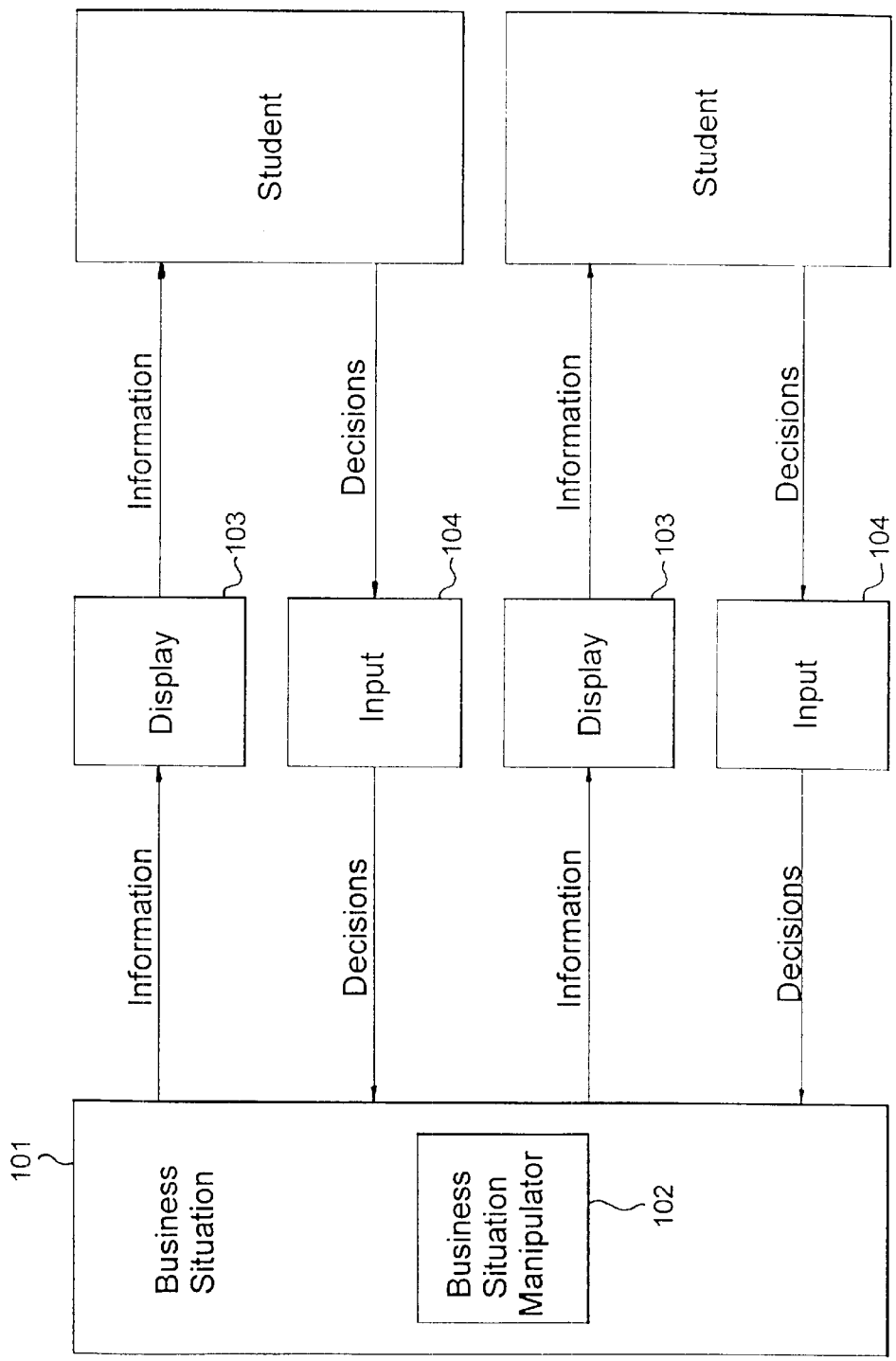
FIG. 1 is a block diagram of an MTS.
Figure 2:
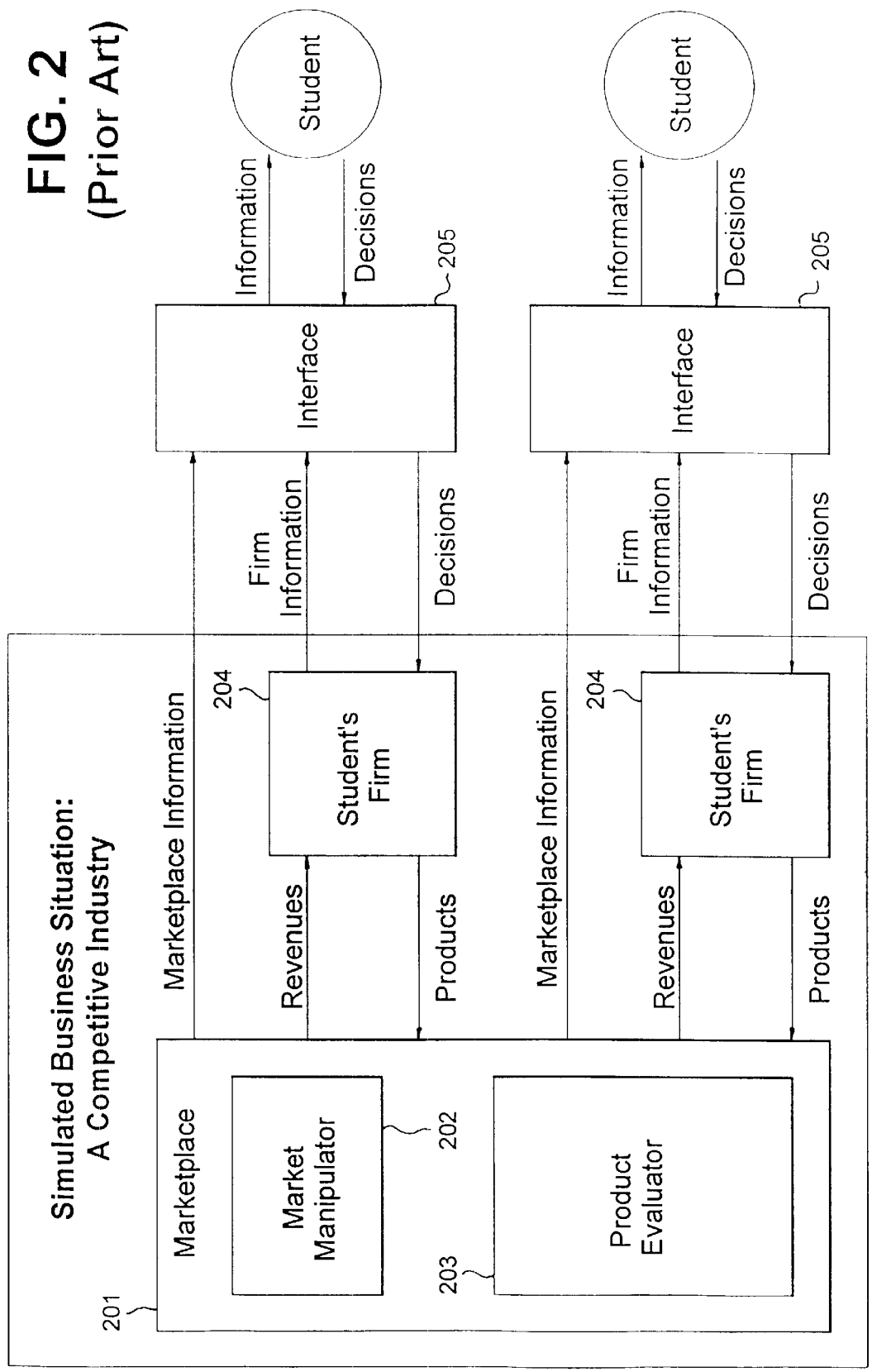
FIG. 2 is a block diagram of the standard architecture of a competitive industry MTS.

The present invention realizes improvement to the marketplace model in MTSs by building upon new ideas from the fields of evolutionary economics, evolutionary biology, and genetic algorithms, and from studies in the management of innovation, the present invention improves upon MTSs. Primarily, and with additional important consequences, the present invention improves MTSs modeling of information, knowledge, and innovation. For the purpose of exposition, the detailed description of the invention and preferred embodiment describe the specific class of MTSs called competitive industry MTSs. Those versed in the art will appreciate that the invention described herein applies to MTSs that emphasize other business situations. Thus, the later section titled "Other Applications" describes more general instantiations of the current invention, and, in particular, the more general class of MTSs depicted in FIG. 1.

An MTS in accordance with the present invention is a departure from prior art simulations in its use of attribute-characteristic representations of products, the inclusion of product categories, and the use of new product value functions and correlations. These concepts are introduced and defined below, and the consequences of incorporating these new features into MTSs is discussed thereafter in connection with a preferred embodiment of the invention.

Introduction and Definitions

Products

Recall that some known MTSs describe products with attributes. For example, one may describe the design of an automobile with a list of attributes that includes physical qualities (such as color, size, and shape), features (such as antilock brakes and power windows), and abilities (top speed, miles per gallon city, miles per gallon highway). Using this representation scheme, automobiles are objects composed of the following attributes (style, engine type, drive train type, exterior color, window feature, brake feature, top speed, mpg city, mpg highway). Each attribute varies either quantitatively (for example, mph city and top speed) or qualitatively (for example style). Using a value function of a type described below, one can also have attributes that vary both qualitatively and quantitatively. An example of such an attribute is color. Color may vary qualitatively (for example, red, blue, and green) and in intensity (light blue to dark blue). One can represent intensity quantitatively with a number (for example, a ten point scale). I call an attribute that can vary both qualitatively and quantitatively a dual varying attribute. Including a dual variable attribute in the automobile example, automobiles are objects composed of the following attributes (style, engine type, drive train type, exterior color(intensity), window feature, brake feature, top speed, mpg city, mpg highway). A specific automobile is identified by the vector of characteristics (sports car, 4-cylinder engine, front wheel drive, blue exterior(intensity=5), . . . , electric windows, anti-lock brakes, 115 mph, 23 mpg city, 33 mpg highway). With this method, every product design is represented with a unique vector of characteristics. This method of representing a product's design is called an attribute-characteristic representation.

The attribute-characteristic representation is much more general than demonstrated by the preceding automobile example. The number of attributes in a product design can vary throughout a learning session and from product-to-product (like the way in which word length varies in a game of scrabble). Attributes can be real valued (such as top speed), integer valued (such as an integer scale of one to ten), or qualitative (such as a letters). In the case of qualitatively varying attributes, each attribute can express characteristics from a different sets of characteristics (colors verses styles in the automobile example); characteristics from the same set, with duplications allowed (for example, letter combinations that produce words); or characteristics from the same set, without duplications (permutations). In addition, attributes can be diploid (such as dual varying attributes and the dominant-recessive genes made famous by Gregor Mendal's experiments with peas), triploid, or even more complex. Also, the attribute-characteristic method of accounting for a product's design can be recorded as a vector (as done above), with a matrix, as a single number, or through other suitable means.

The attribute-characteristic representation provides the means for representing all valid product designs. Recall that an attribute's domain specifies all of the possible characteristics that the attribute can express. The set of all valid products is produced by taking the cross-product of all the attribute domains (that is, taking every combination of characteristics).

The form of the attribute-characteristic representation is determined on a case-by-case basis with regard to the purpose of the MTS, the value function utilized (see below), and the available data structures.

Product Categories

A product set defined by product characteristics is called a product category. A notable quality of the attribute-characteristic representation of a product's design is that one can easily define sets of products by characteristics. This quality is not important in prior art MTSs but, for reasons described below, is important in the present invention. For qualitatively varying attributes, one defines a product category by the presence or absence of one or more characteristics. Three examples of product categories are (1) sports cars, (2) cars with four cylinder engines, and (3) sports cars with four cylinder engines. On the other hand, for quantitatively varying attributes, one defines a product category by specifying a range of values for the attribute. Three examples of such product category are (1) cars with a top speed between 90 mph and 110 mph, (2) cars that have at least 20 mpg city, and (3) cars with a top speed between 90 mph and 110 mph and have at least 20 mpg city. In defining product categories, dual varying attributes are specified by the combining the two methods illustrated above (for example, blue cars with color intensity between 3 and 7). A product category, therefore, can be defined based on the presence and/or the absence of attributes and can include any combination of qualitative or quantitative or other type of attributes.

The Product Value Function

The product value function explores the relationship and interaction among the attribute-characteristics of a product design by quantifying the degree to which interactions among product attributes and characteristics affect products' values. Interactions exist when an attribute contribution to the value function depends upon the characteristics expressed by one or more other attributes. For example, how much value does a red exterior add to the value of a particular automobile? This question is difficult to answer. The value of a red exterior depends upon an automobile's style. It is highly valued on sports cars but not on limousines. In this example, the contribution-to-product value of a particular characteristic express by one attribute (here, exterior color) depends upon the characteristics expressed by other attributes, e.g., style). This effect is called an interaction and for some attribute-characteristics can be associated with "frustration".

Frustration occurs when improving one attribute's contribution to product value decreases the contributions of other attributes. Strong frustration exists when the effect decreases the total product value and such frustration makes product design a difficult task. In the automobile example, changing the characteristic expressed by the style attribute from sports car to limousine increases the contribution of the style attribute to the product's value. Simultaneously, this change decreases the contribution of the red color expressed by the exterior color attribute. In total, the value of the automobile decreases.

As used herein, a product value function in which interactions produce strong frustration and therefore exhibit multiple optima are referred to as "multipeaked value function" (see the glossary). The present invention uses multipeaked value functions in an MTS to more closely model, among other things, innovation. These functions can be found in optimization problems from a variety of fields, including combinatorial optimization, genetic algorithms, cellular automata, computer science, molecular biology, management science, and evolutionary biology. Specific examples of optimization problems that include a multipeaked value functions include designing the layout of an integrated circuit, finding the shortest tour connecting a set of cities, scheduling production in a factory, and finding a protein that catalyzes a particular reaction.

A Visual Metaphor

One can understand the multipeaked value function, and its difference from the prior art distance value functions described in the Closing Remarks below using a visual metaphor. Consider all possible product designs to lie along a horizontal surface, with similar products lying close to each other and dissimilar products lying far from other products. Assuming no dual varying or similarly complex attributes, if a product has n attributes, one would need an n-dimensional space to properly accomplish this task. A visual metaphor is appropriate for considering a two attribute product.

To complete the visual metaphor, a mark is placed above each product at a height equal to the overall value of the product that it resides above. When this task is completed, one has created a distribution of product values over the surface of the products. This multidimensional arrangement of products together with the distribution of product values is called a product space. The shape of the distribution of product values in a product space is called the product space's topology.

The product space's topology shows how design quality varies over the product space. The product space can be visualized as a mountain range with the most valued products lying on the surface beneath mountain peaks and the least valued product lying on the surface beneath valleys. The topology of the mountain range significantly affects the nature of students' task in an MTS and the dynamics of an MTS. Does the product space topology resemble Mount Fuji: a single peak, with broad, smooth slopes? Does the product space topology resemble the Rocky Mountains: many peaks of varying heights, valleys of varying depths, and sudden changes in altitude?

Figure 3:
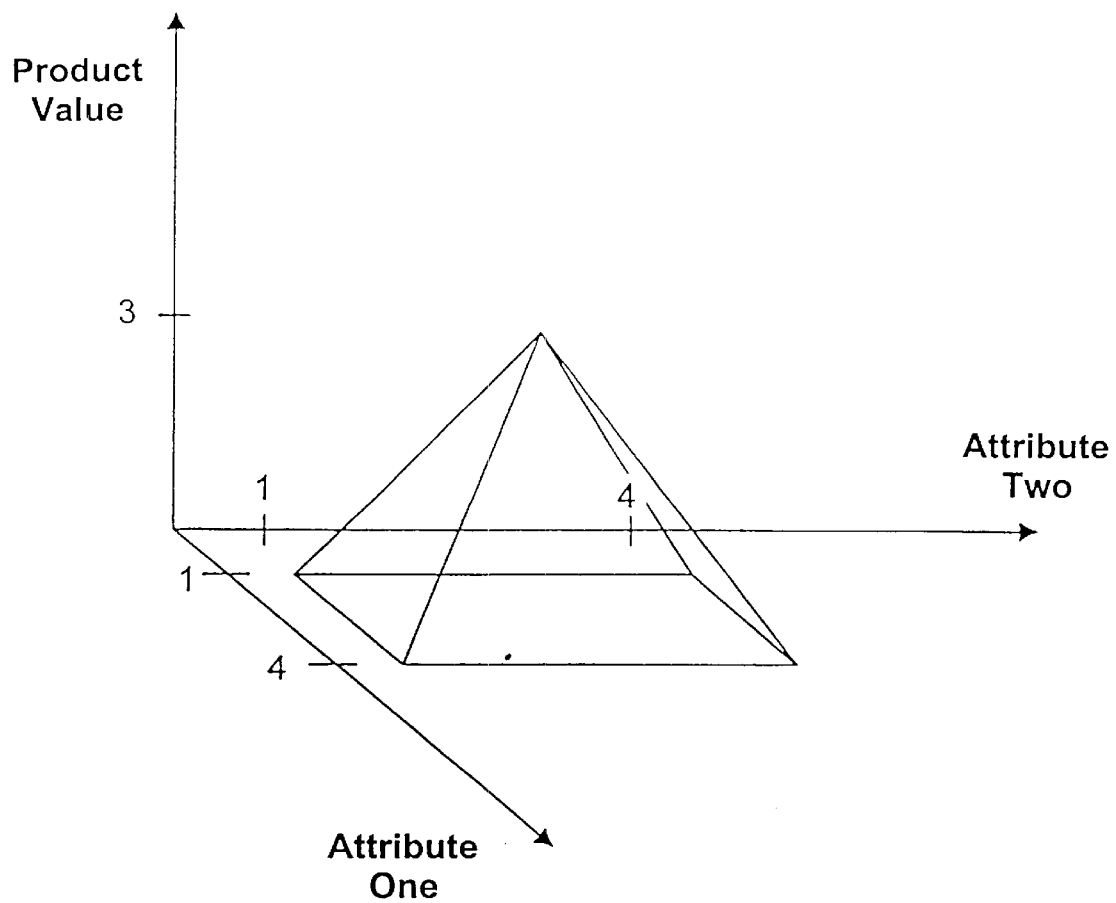
FIG. 3 depicts a single peaked value function.

In both the visual metaphor and the real multidimensional product space, the amount of frustration among attributes determines the topology of the product space. If there is no strong frustration (as in the prior art, where there is no frustration—see the Closing Remarks), the topology is Mount Fuji-like, that is, single peaked. FIG. 3 provides a two attribute example. In this figure, products have two attributes (plotted along two of the axes), each of which expresses a real number between one and four. The value function is single peaked like a pyramid or cone to pick two basic geometric forms. The product value varies from zero to three (along the third axis).

Figure 4:
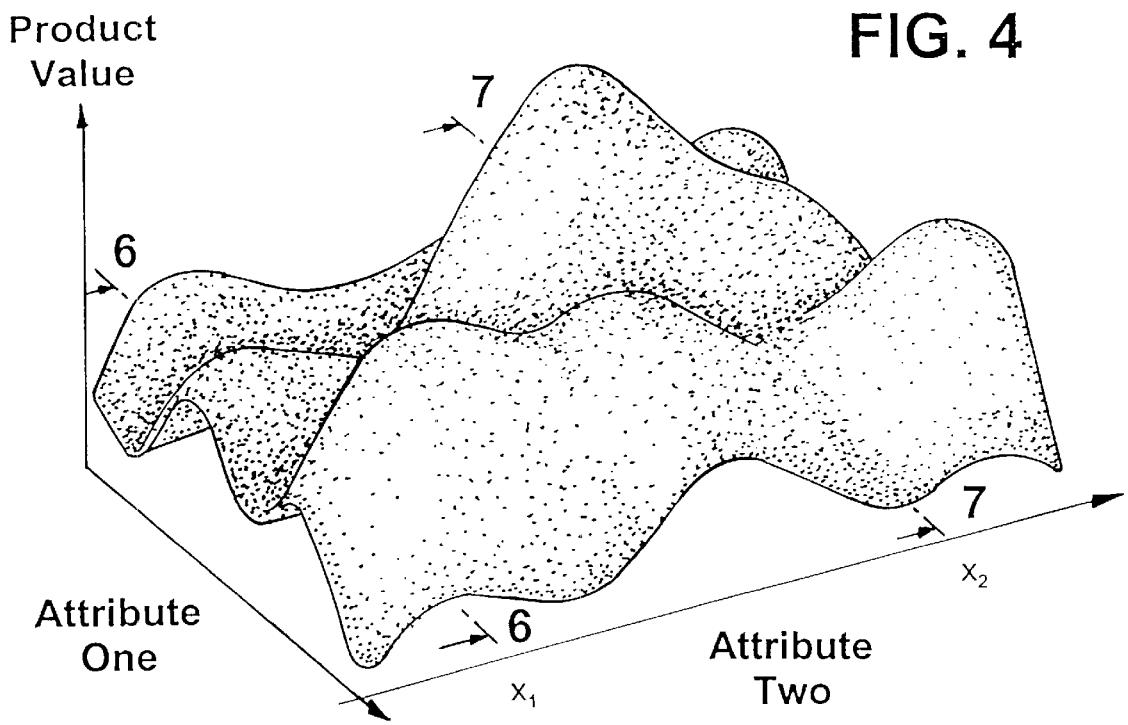
FIG. 4 depicts a multipeaked value function in a three-dimensional landscape representation of product value verses two attributes.

However, when strong frustration exists, the product space can have a multipeaked topology. In formal terms, a multipeaked value function has as least one local optimum, in addition to a global optimum. FIG. 4 provides an illustration of a two attribute, multipeaked value function in which the two attributes exhibit strong frustration. As described below, it is this complex topology that produces the unique qualities of the present invention. For a good discussion of the differences between smooth and rugged value functions, see: Stuart Kauffman, *The Origins of Order: Self-Organization and Selection in Evolution* (New York: Oxford University Press, 1993), chapter 2.

In addition to its multiple optima, multipeaked value functions of the type used in the present invention possesses another property absent from smooth and some rugged value functions: an optimal product cannot be discovered by varying the attribute-characteristics independently. To illustrate this property, consider a product that has two attributes: $a_1$, and $a_2$, where each attribute expresses an integer between one and ten. Suppose that the product in the product space with the highest value has $a_1=3$. In the prior art value functions, for any value of $a_2$ three is the best choice for $a_1$. Because of this, student's using prior art MTSs can find the best product by treating each attribute independently (see the Closing Remarks). In the example above, once a student has discovered that three is the best value for attribute one, he need not consider attribute one again. He can focus exclusively on finding the best value for attribute two. However, when a multipeaked value function is used, the best value for an attribute depends upon the characteristics expressed by other attributes. FIG. 5 demonstrates this quality.

Figure 6:
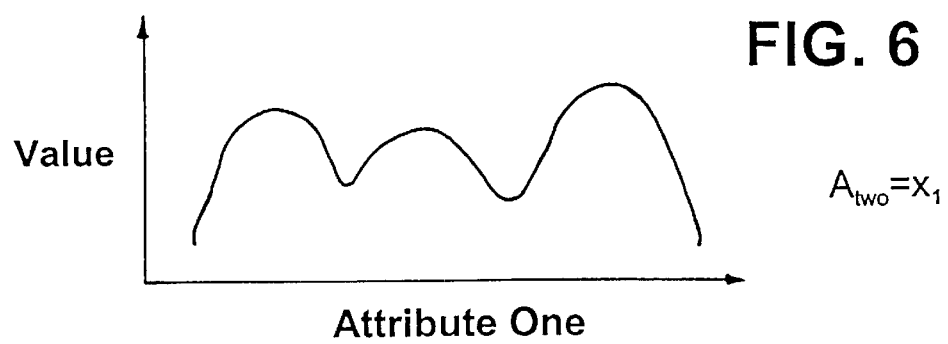
FIG. 6 depicts a 'slice' from FIG. 4 in a two-dimensional curve representation wherein one attribute is held constant.
Figure 7:
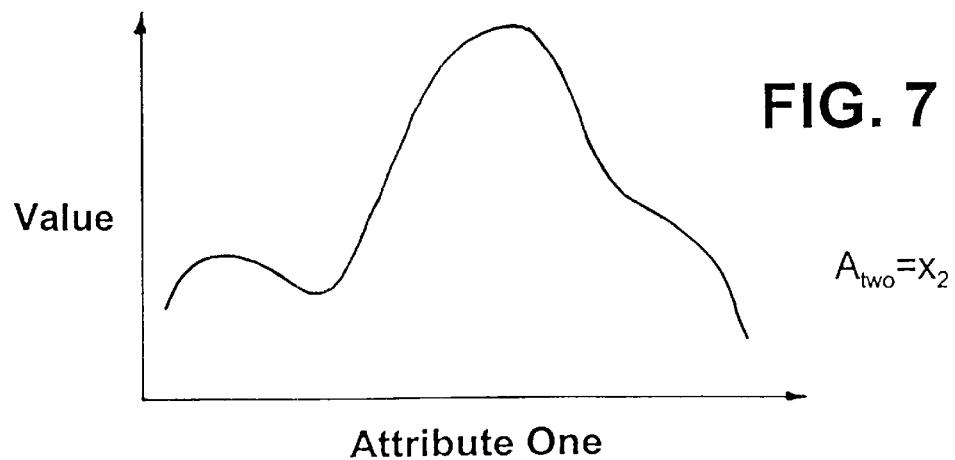
FIG. 7 depicts a 'slice' from FIG. 4 in a two-dimensional curve representation wherein one attribute is held constant.

FIG. 5 shows a value function for products that have two attributes, each expressing a characteristic from the set {A,B,C,D}. In FIG. 5, no two rows have their highest value in the same column. Likewise, no two columns have their highest value in the same row. FIGS. 6 and 7 illustrate this same quality for the value function depicted in FIG. 4. Each figure depicts a 'slice' that shows how the value function varies with $x_1$ for a different particular value of $x_2$. As can be seen, the best value for $x_1$ in FIG. 6 is not the best value for $x_1$ in FIG. 7. Because of this quality of multipeaked value functions, students cannot find the optimal product by considering each attribute independently. Instead, students must simultaneously consider several attributes, and this interaction of attributes has consequences described below.

Correlation

Correlation is a function of the product value function and is closely related to product space topology. In MTSs in accordance with the invention, students will use their knowledge of the value of one product design to predict the values of others and the quality (fit) of their prediction depends on correlation. The capability of information about the values of products to predict the values of other products is given by measures of correlation. For this reason, measures of correlation are useful in selecting the value function that produces the information properties desired for a particular MTS.

The predictive capacity of information increases and decreases with measures of correlation. These measures show that single peaked value functions are highly correlated over the product space. Information about the values of products provides significant information about the values of many other products. For multipeaked value functions, correlation decreases with strong frustration. Specifically, if changes in product design or product category definition include changes to attributes that exhibit strong frustration, correlation will decrease faster than in single peaked value functions. For an example of this effect, see: Bernard Manderick, Mark de Weger, and Piet Spiessens, "The Genetic Algorithm and the Structure of the Fitness Landscape," in *Proceedings of the Fourth International Conference on Genetic Algorithms,* edited by Richard Belew and Lashon Booker (San Mateo, Calif.: Morgan Kauffmann Publishers, 1991), pp. 143—150. As more or larger such changes occur, correlation will decrease even faster. Because of this quality, correlation on multipeaked landscapes is typically high for only small changes. Metaphorically, this means information is useful only in making localized predictions about the mountain range topology.

Students can use either of two methods to predict product values:

1. Students will use their knowledge of the value of a specific product to predict the resulting value of design changes. For example, how well does the value of the automobile (sports car, 4-cylinder engine, front wheel drive, blue exterior, . . . , electric windows, anti-lock brakes) predict the value of the automobile (utility vehicle, 4-cylinder engine, front wheel drive, blue exterior, . . . , electric windows, anti-lock brakes)? The capability of knowledge of the value of one product to predict the values of other products depends on how correlation varies with changes in a product's design.
2. Students may also use the value of products in a category to predict the values of products in another category. For example, what do strong sales of front wheel drive sports cars indicate about the values of rear wheel drive sports cars? The values of products in one category will be good predictors of the value of products in another category if the categories are correlated.

For each type of prediction, and for the purpose of selecting a value function for use in an MTS, appropriate measures of correlation exist:

To calculate the predictive capacity of knowledge of the value of a given product for the purposes of a design change, one uses an autocorrelation formula with changes stemming from the existing product design. For a description of the autocorrelation function, see Manderick, et al., supra. The autocorrelation function is usually discussed with reference to qualitatively varying attributes. For quantitatively varying attributes, one generates the required sequences of designs by iterative applications of the following steps:

1. randomly choose an attribute,
2. randomly choose a number from the set $\{-x, +x\}$, where x is small compared to the range which the attribute can vary, and
3. add the chosen number to the attribute's value. By using a small x, one ensures that the perturbation of the attribute is a small step in the 'mountain range.'

To measure the correlation between two sets of products, one performs the following procedure:

1. Form a set of products consisting of the union of the two product categories.
2. From the union, randomly choose several different products (the quality of the estimate increases with the number of samples).
3. Ascertain that each randomly chosen product is a member of at least one of the product categories. To calculate correlation, each of the randomly chosen products must be paired with a product from the other product category. Specifically, pair the randomly chosen product with the product in the other category that is most similar. If several products tie on this criterion, randomly select one of these products for pairing. In the case of qualitatively varying attributes, similarity is defined as having the greatest number of characteristics in common. In the case of quantitatively varying attributes, similarity is measured by a distance function, where products that are closer together are more similar.
4. For each pair of products, calculate the products' values.
5. From the pairs of product values, one can calculate the correlation between the two product categories using the standard equation from statistics.

To aid an MTS designer in selecting a value function, there are several useful correlation functions discussed in related academic research, as well as their relationship to product space topology, see: Manderick et al., supra; see also Marc Lipsitch, "Adaptation on Rugged Landscapes Generated by Iterated Local Interactions of Neighboring Genes," in *Proceedings of the Fourth International Conference on Genetic Algorithms,* edited by Richard Belew and Lashon Booker (San Mateo, Calif.: Morgan Kauffmann Publishers, 1991), pp. 128—135; Stuart Kauffman, *The Origins of Order: Self-Organization and Selection in Evolution* (New York: Oxford University Press, 1993), pp. 63–66. Bernard Manderick, "Correlation Analysis," in Thomas Back, David Fogel, and Zbignies Michalewicz, *Handbook of Evolutionary Computation* (New York: Oxford University Press, 1997), section B2.7.3 (hereafter referred to as HEC).

Some Examples of Value Functions

The attribute-characteristic representation and the value function work together; however, in order to apply an attribute-characteristic representation, one must define a value function that can accept its form (that is its combination of qualitative, quantitative, and other, more complex attributes) or else the attribute-characteristic representation cannot be used in a model or simulation. "Management Applications and Other Classical Optimization Problems," by Volker Nissen in section F1.2 of HEC provides list of references of academic articles that investigate the optimization of these kind of value functions. From reviewing these articles, one can find many examples of suitable value functions, some of which may be found to be suitable to the task upon experimentation. Some examples of suitable multipeaked value functions for modeling innovation include:

Quantitatively Varying Attributes

The "after Fletcher and Powell" function described in Thomas Back's *Evolutionary Algorithms in Theory and Practice* (New York: Oxford University Press, 1996), offers a function for representing quantitatively varying attributes. In this case, each product attribute represents a coordinate axis. Using Back's formulas, one may incorporate any number of attributes. Such a function can be applied here to accommodate qualitatively varying attributes and dual varying attributes by coding one or more of the coordinate axes into a discrete representation. Genetic algorithms frequently convert a real numbered axis into a base two (bit string) representation. A description of this process is given in Alden Wright's, "Genetic Algorithms for Real Parameter Optimization," in *Foundations of Genetic Algorithms,* edited by Gregory Rawlins (San Mateo, Calif.: Morgan Kauffman Publishers). Using an analogous process, one can convert a real numbered axis into a discrete representation of any base and with any number of attributes.

Qualitatively Varying Attributes

1. One can use any continuous multipeaked function to model qualitatively varying attributes by converting the axes into a discrete representation. For example, one can convert each axis of a two dimensional "function after Fletcher and Powell" function into hexadecimal representation that has six digits. This would produce a product that has twelve qualitatively varying attributes, each expressing sixteen characteristics. Nk-landscapes: Biologist Stuart Kauffman developed nk-landscapes in his research into to the properties of rugged value functions. For a description of nk-landscapes, see Stuart Kauffman's *The Origins of Order: Self-Organization and Selection in Evolution* (New: York Oxford University Press, 1993), chapter 2. The nk-landscape is particularly useful because its parameters permit one to easily adjust its correlation properties.

2. Many combinatorial optimization problems provide suitable value functions. For example, one can look to scheduling or packing problems for suitable functions. RalfBurn's article "Scheduling," in section F1.5 of HEC describes scheduling problems and also describes, with references, several alternative attribute-characteristic representations that one may use with scheduling problems. Similarly, Kate Juliff's article, "The Packing Problem," in section F1.7 of HEC describes packing problems and also describes, with references, several alternative attribute-characteristic representations that one may use with packing problems.

Dual Varying Attributes

The product value function for representing dual varying attributes can be the objective function used in combinatorial optimization problem of a traveling salesman problem (TSP). "The traveling salesman problem is the problem of visiting each vertex (i.e., city) in a full connected graph exactly once while minimizing a cost function defined with respect to the edges between adjacent vertices. In simple terms, the problem is to minimize the total distance traveled while visiting all the cities [in a set of cities] and returning to the point of origin." Darrell whitley, "Permutations," in section C1.4 of HEC, p. C1.4:1. When using the objective function of a TSP, the characteristics expressed by attributes are the destinations (cities) in the TSP.

In order to create dual varying attributes, in accordance with an aspect of the invention, one adds a reference point to the TSP. The intensity of any attribute is equal to the distance form the reference point. As students adjust the intensity of a dual varying attribute, the destination expressed by that attribute moves so that the new intensity equals the distance between the destination and the reference point. A product's value is then calculated with this new configuration of destinations. Note that with this method, any number of attributes can be converted from qualitatively varying attributes to dual attributes.

What Kind of Products Does the New Method Use?

What kind of products could the system just described represent? Utilizing this system for 'real' products is problematic; one will have great difficulty in matching the multipeaked value function to a real product. Two methods can resolve this dilemma. First, the product could be the subject of an optimization problem. For example, if the objective function from a scheduling problem is used as the multipeaked value function, the products can be schedules. Second, the products could be abstract. For example, if an nk-landscape is used as the multipeaked value function products can be strings of letters, as in the preferred embodiment. Similarly, if a function after Fletcher and Powell is used as the multipeaked value function, then the products can be real value vectors. Because students will have difficulty 'feeling' that they are managing a business when the product is abstract, one can give abstract products a visual representation, such as plants or flowers.

A Preferred Embodiment of the Invention

A basic MTS embodying the present invention is described with reference to FIG. 8 to focus attention on the construction and workings of the model of the invention in an MTS. In the following discussion, products are described as including only one trait. However, they can include traditional conventional further traits including business process traits and aggregates. Thus, in the following description, products have only qualitatively varying attributes. In addition, for simplicity, the interface is minimal, and firms have few characteristics. Though unembellished, the embodiment shows how to incorporate multipeaked value functions in an MTS. From this example one can construct more sophisticated MTSs, including product definitions which include system-set attributes.

Figure 8:
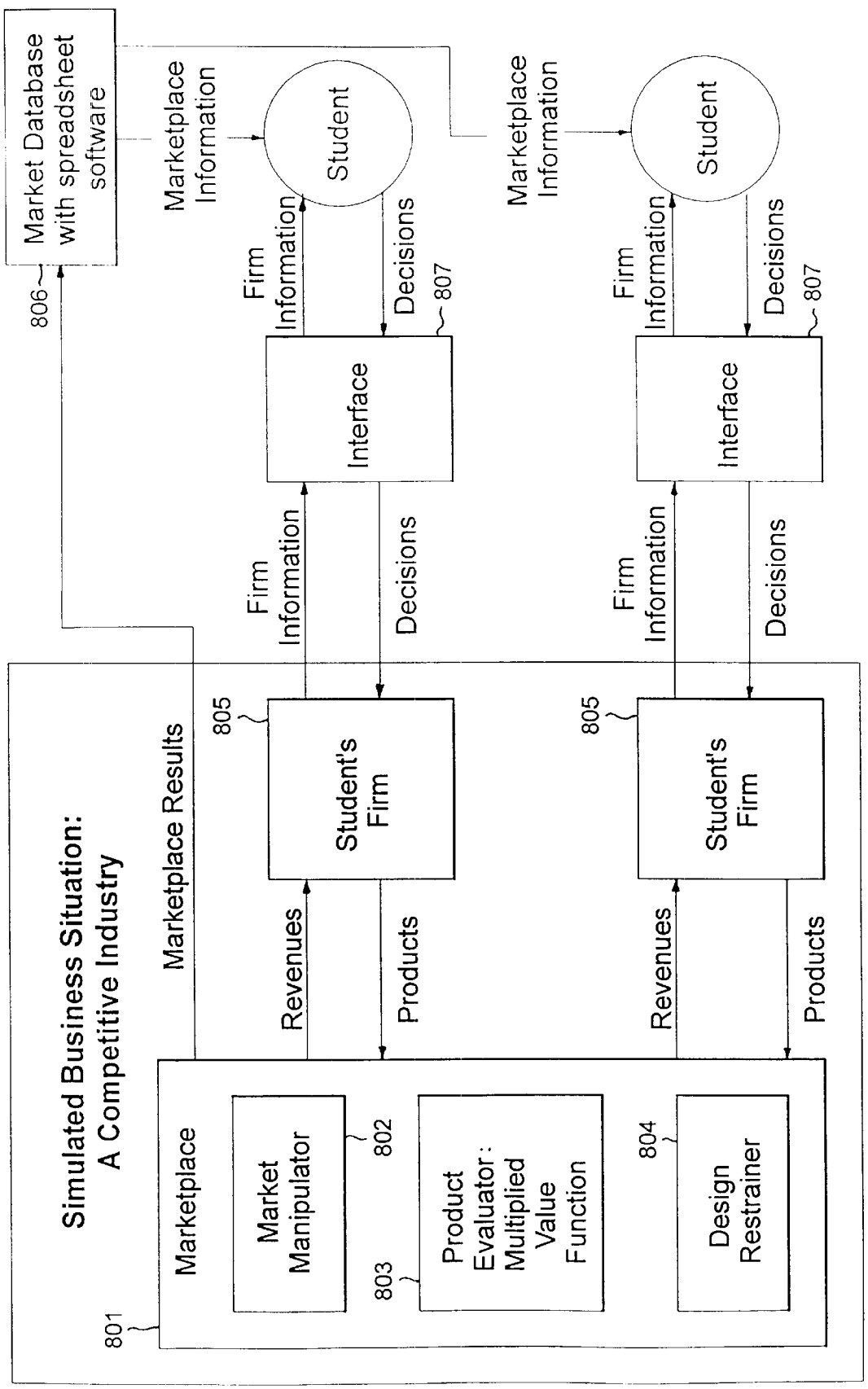
FIG. 8 is a block diagram illustrating the architecture of an MTS in accordance with the present invention.

FIG. 8 displays the architecture of an MTS in accordance with the invention. Many of the components are similar to those a conventional MTS: a marketplace (801), a plurality of firms controlled by students (805), and interfaces (807). In addition, however, an MTS in accordance with the invention includes a market database (806) which contains records of each product's sale in all rounds of a learning session. With this additional information, students can analyze the entire history of the marketplace.

Preferably the MTS comprises of two programs and a spreadsheet file:

1. Program #1 models the (a) marketplace (801) and (b) firms (805) and (c) provides an interface (807) for each student.
2. Program #2 is a spreadsheet program for viewing and analyzing the marketplace results (for example, Microsoft Excel or Lotus 123).
3. A spreadsheet file defines the market database (806) containing a record of all of the marketplace results.

The functionality and operation of these components are discussed next.

1(a): Marketplace Specifications

Products

Figure 9:
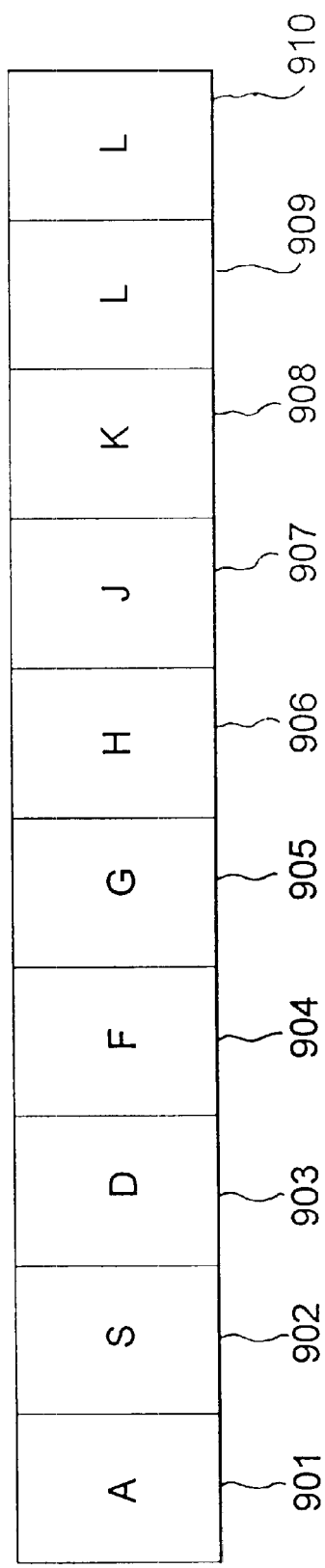
FIG. 9 illustrates a product in the preferred embodiment.

Products are comprised of an arbitrary number of attributes (e.g., n=10). Each attribute varies qualitatively and can express one of twenty-six characteristics. These characteristics are represented by the letters of the alphabet. For example, the sequences 'ASDFGHJKLL' and 'QWERTYUIOP' are different products. FIG. 9 displays the product 'ASDFGHJKLL' having ten fields (901–910). The letter in each field is the characteristic expressed by (that is, the instantiated value of) the corresponding attribute in the product 'ASDFGHJKLL'.

The Product Value Function

In a preferred embodiment, the value of a product is calculated with an nk-landscape function, although other multipeaked value functions can be used. An nk-landscape has four parameters that are important for MTSs. These are (1) the number of product attributes, n, (2) the number of characteristics that each attribute can express, b, (3) the average number of interactions per attribute, k, and (4) the arrangement of the interactions over attributes. The value of k is particularly important. It permits adjusting the amount of interactions, frustration, and correlation in the nk-landscape. By adjusting k one can achieve an appropriate multipeaked value function for use in the present invention, as described next.

The values of n, k, b are selected to produce an appropriate product value function. As the number of product attributes n increases, the variation in product values decreases. For this reason, products in the MTS preferably have fewer attributes and a greater number of characteristics. This allows for sufficient variation in product values while still presenting students with a sufficiently difficult design problem.

In the embodiment described herein, n=10, b=26, and k should have a value of $2 \leq k \leq 4$. One can arrange interactions evenly over attributes. This produces a value function with high correlation for small changes in product design (for example, a change of a single characteristic) and low correlation for more substantial design changes. From these recommendations, one of skill may adjust the values of the n, k, and b parameters to suit their particular MTS needs.

The Market

In the marketplace model of this illustrated embodiment, products have only one trait: product value. A market manipulator 802 accepts product value as its independent variable and calculates demand each round. To calculate demand, the market manipulator preferably uses a set of equations as described in U.S. Provisional Application Serial No. 60/094,900, filed Jul. 31, 1998, or the Gold and Pray system of demand equations. Steven Gold and Thomas Pray, "Simulating Market-and Firm-Level Demand Functions in Computerized Business Simulations," Simulations and Games, vol. 15 (September 1984): pp. 346–363.

Technological Advance

At the start of a learning session, the MTS restricts the domains of one or more attributes, thereby limiting product design to sufficiently low valued products (for example, only characteristics 'A' through 'G' are allowed in product designs). Students compete by searching for the best set of characteristics to define a product. During the learning session, the restrictions are relaxed, either incrementally (a few characteristics each round) or altogether (all restrictions removed in a single round), as described below.

Royalties

Define products as similar if they differ by less than a predetermined number of characteristics. A product is new to the marketplace if (1) it is appearing in the marketplace for the first time and (2) no similar products have appeared in the marketplace. If a firm produces a product that is new to the marketplace it has rights to the product and all similar products. This means that, for a limited number of rounds, if competing firms produce the product or a similar product, they must pay a royalty to the inventing firm. The duration and size of the royalty are adjustable parameters, set at the start of the learning session. One versed in the art can easily set the royalty parameters as desired and/or to fit real-world industry practice.

Manufacturing

Each unit of production capacity is best suited for manufacturing a particular type of product. This is called its specificity. Production capacity's specificity is designated by a product design. For example, capacity of type ASDFGHJKLL is best suited for producing the product design ASDFGHJKLL. Producing any other type of product increases the variable cost of production. For example, let Z represent the number characteristics in which the design of a product to be manufactured differs from the specificity of the production capacity used in the production. Let Y be the base unit variable cost, and let d be a constant. The cost for producing each unit of product is:

$$\text{Unit variable production cost} = (d*Z) + Y$$

The value of d is set by the MTS at the start of the learning session.

Production capacity is purchased/scraped in blocks of capacity (for example, one hundred units). The cost of a block is constant over all specificities and throughout the learning session. The same is true of the scraping value. Similarly, the base variable production cost is constant over all product designs and throughout the learning session. One versed in the art can easily set the manufacturing parameters as desired and/or in accordance with real-world examples.

1(b): Firms' Specification

Figure 10:
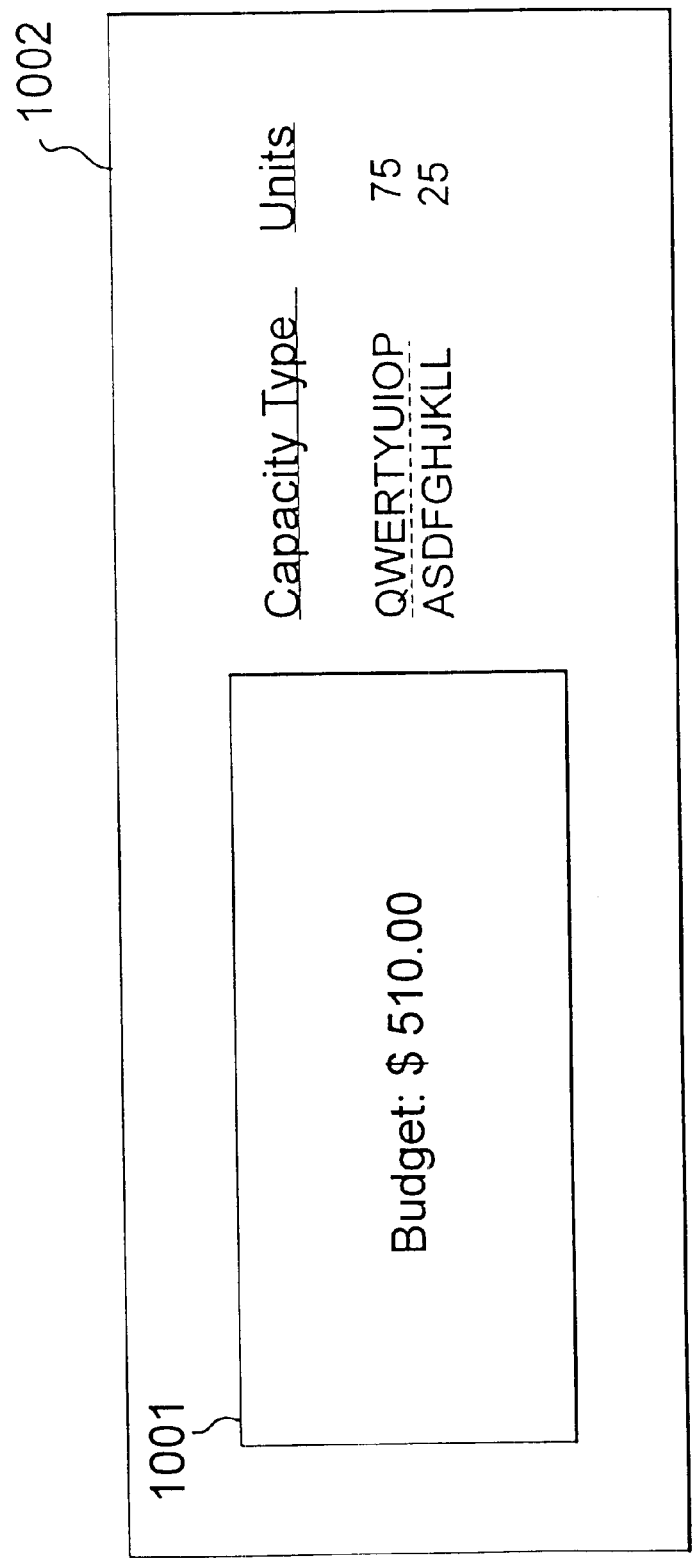
FIG. 10 is a representation of a display presenting a firm's characteristics.

In this MTS, all firms are controlled by students. As shown in FIG. 10, firms have two characteristics: (1) a budget 1001 and (2) production capacity 1002 of identified specificity and unit capacities. The firm of FIG. 10 has a budget of five hundred and ten dollars and two types of production capacity. The firm has seventy-five units of capacity of specificity QWERTYUIOP and twenty-five units of specificity ASDFGHJKLL. With this capability, this firm can produce one hundred units of products each round (assuming its budget covers the variable costs of production and royalties).

In addition to production capacity, firms have three routines or methods. (Firms are programmed as objects in an object oriented programming language). These routines (1) update the firms' budget, (2) update the firms' product capacity, and (3) send the firms' products to the marketplace.

1(c): The Interface

Each student has one interface. The interface has four fields for recording a student's decision. It also has routines for sending information to a student's firm (e.g. by posting the results from a form). (The interface is programmed as an object in an object oriented programming language).

2: Students' Tasks

Marketing Analysis

Each round, the marketplace results are recorded in the market database. Using charts, graphs, and/or any means that they deem appropriate, each student analyzes the market database.

Management

Based on his analysis of the market database, each student (1) analyzes the marketplace result, (2) designs products, (3) chooses products to manufacture, (4) buys and sells production capacity, and (5) determines production schedules.

Figure 12:
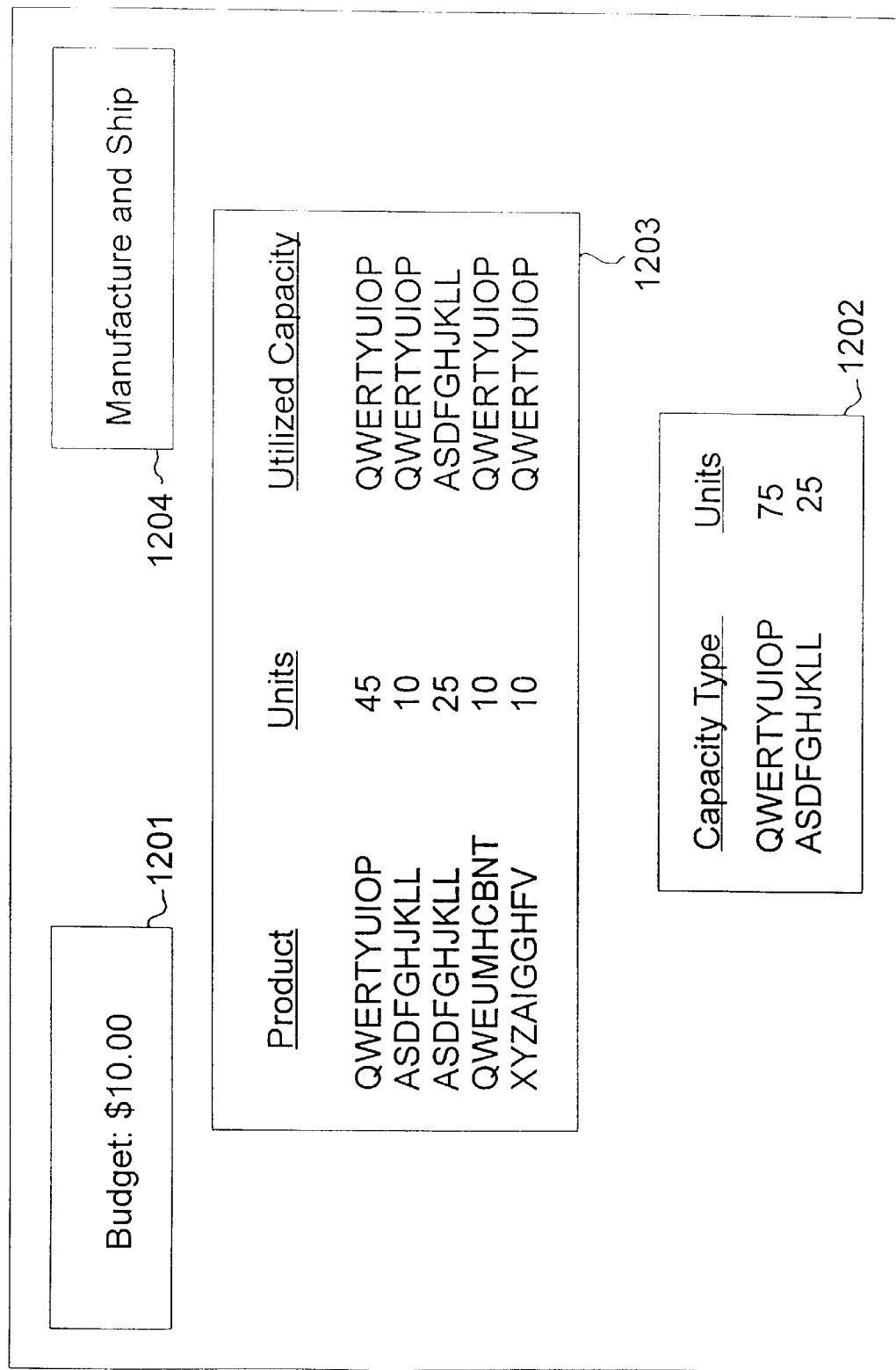
FIG. 12 is a representation of a display of an interface.

The interface helps a student keep track of his decisions. FIG. 12 depicts an interface.

The interface contains four fields:

1. Field 1201 shows the student's firm's budget.
2. Field 1202 shows a student's firm's production capacity. The left side lists the specificity of the production capacity. The right side lists the units of capacity. FIG. 12 depicts two types of capacity: QWERTYUIOP with seventy-five units and ASDFGHJKLL with twenty-five units ("Units").

A student purchases/sells production capacity by increasing/decreasing the maximum production listed in the right column. The student can also purchase new production capacity by adding a new row to the list. This method must be used when purchasing production capacity with a specificity that differs from the firm's current production capacity. As a student purchases/sells production capacity, the interface automatically adjusts his firm's budget (displayed in field 1201).

3. In field 1203 a student enters his firm's production schedule for the current round. In its three columns, the student lists the products to be produced, the production amounts, and the capacity utilized. FIG. 12 shows five entries. Notice that separate entities are required whenever the product or utilized capacity differs. As a student develops a production schedule, the interface automatically adjusts his firm's budget (displayed in field 1201).

4. Field 1204 is the 'manufacture and ship button.' When satisfied with his production decisions, a student uses a mouse to 'click' on this button. This signals that his decisions are complete. If the production decisions have not reduced the budget to negative values, the interface sends the student's production decisions to his firm.

A negative budget means that the student's production decisions require more capital than the student's firm has in the current round. If a student tries to 'manufacture and ship' with a negative budget as determined by a script, function call, or applet; in a conventional manner, the interface alerts the student to the problem. The student can then adjust his capacity and production schedule accordingly.

3: The Market Database Specifications

The market database is a spreadsheet file on a student's computer. FIG. 11 shows a market database. Firms' production are listed in rows, with each row listing a specific type of product produced by a firm. The first column of this file lists the period that products were sent to the marketplace. The next ten columns specify the product type by listing its characteristics. Column twelve lists the firm that produced the products. Column thirteen lists the number of products sold in the marketplace.

4. The Operation of the Preferred Embodiment of an MTS

The MTS of the invention generally progresses through the five steps of prior art MTSs which are repeated each round. In addition, the present MTS also requires two additional steps that occur only once during a learning session. First, the MTS initializes the learning session before the initial round. Second, the MTS simulates a technological breakthrough during the learning session. Below, I describe the five steps repeated each round and then I describe the two additional steps.

The Five Steps Comprising Each Round

Steps One, Two, and Three

As described earlier, the first three steps of an MTS consist of each student (1) analyzing the marketplace information, (2) making decisions for his firm, and (3) sending these decisions to his firm through the interface. This includes the following tasks:

1. Each student views and analyzes the market database for the purpose of designing products and setting a production schedule for the round. To accomplish these tasks, students utilize charting, graphing, intuitive heuristics, and/or other means that they deem useful. Necessarily, as described below, students hypothesize product categories and perspectives. For simplicity, this embodiment does not record or analyze this process.
2. Based upon their analysis of the market database, each student designs new products for his firm.
3. Choosing from the products previously offered to the marketplace and from his new designs, each student selects products to manufacture in the current round.
4. Each student determines the production volume for each product that he will manufacture. If desired, each student can buy new production capacity or sell unused production capacity. When making production decisions, a student cannot exceed his firm's budget. Students should account for the cost/revenue of buying/selling production capacity, the variable production costs, and royalties.
5. Using the interface, each student sends his production plans to his firm.

Step Four

After the interface sends a student's production plans to his firm, the MTS causes for each firm (1) an update to its production capacity, (2) an update its budget, and (3) sends the products and production volumes of that firm to the marketplace.

Step Five

The marketplace receives the production from firms. Using an nk-landscape function as a product value function described above, a product evaluator (FIG. 8, field 803) evaluates each product. After products are valued, the market manipulator (FIG. 8, field 802) takes the products' values as input and calculates demand using either the equations in the aforesaid provisional patent application or a Gold and Pray system of demand equations. From the demand and firms' production, the marketplace calculates sales. The marketplace then records the results in the market database and sends the revenues to the appropriate firms. Subsequently, the firms' routines update their budgets accordingly.

After completing these five steps, the round is complete, and the next round, if any, begins with step one.

Additional Steps for Initializing the Learning Session

Initializing

Before a learning session can begin, the computer must initialize the learning session. To accomplish this, it performs the following steps:

1. The computer gives each firm a starting budget.
2. The computer simulates a round of sales and places the results in the market database. This is done so that the market database will contain analyzable data for the first round of a learning session (data as used herein includes the singular). To simulate sales, the computer randomly generates a sufficient number of products and 'manufactures' a predetermined number of each product. The computer then calculates sales using the procedure presented above. The results are placed in the market database, listing the round as zero. No revenues are sent to firms.
3. So that the MTS can simulate an industry life cycle in later rounds, the design restrainer (FIG. 8, field 804) restricts the domains of one or more product attributes so that students can only design products of sufficiently low value. To do this, the computer searches randomly (or with an algorithm such as a genetic algorithm) for a product of sufficiently low value. Once one is found, the computer identifies a correlated set of products. The computer does this by identifying the attributes that affect the greatest number of other attributes (the most interactive attributes). The domain of each of these attributes is restricted to one characteristic: the characteristic that it expresses in the identified low value product. At the start of the learning session, only the products that conform to these constrained domains are valid products.

Simulating a Technological Breakthrough

Through competition, students will settle on a category of products from the initially valid set of products. Once this occurs the number of innovations in each round will decrease. The decrease occurs because as designs improve it becomes more difficult, and therefore costly, for students to find better designs from the same product category. The MTS monitors the rate of innovation. When the rate of innovation is sufficiently low, the design restrainer, 804 of FIG. 8, as implemented by the central computer, 2010 of FIG. 20, or instructor, 2020 of FIG. 20, expands the domains of the product attributes that have been restricted. This simulates a technological breakthrough. The design restrainer can restore the full domain of the attributes in a single round or does so piecemeal over several rounds. As domains expand, students can search through the larger set of allowable products. When all of the restrictions are removed, students can search the entire product space.

Use of the MTS of the Preferred Embodiment

The MTSs' of the preferred embodiment models changes the simulation of innovation and technological advance. It also fundamentally affects the students' tasks of analyzing marketplace results and designing products. As these tasks are central in any MTS, all other tasks that an MTS demands of students are also affected, as well as the dynamics of the simulated industry. The use of an MTS according to the invention and its impact on the learning process are described below.

Designing Products

Students design products by selecting the characteristic expressed by each product attribute. When designing products, students face two problems. First, there are an enormous number of designs. In the described embodiment, for example, products can have ten attributes with each attribute expressing one of twenty-six characteristics. Thus, students can choose from $26^{10}$ unique products. A student can consider only a small number of these possibilities. Second, attributes interact and produce strong frustration. Because of this, students cannot optimize design by considering each attribute independently. Instead, each student must discover valued combinations of characteristics.

A student efficiently designs high value products by hypothesizing and evaluating product categories. By using product categories, a student greatly simplifies the design problem and learns decision making skills in the process. He can evaluate the potential of an entire category of products rather than evaluate every single product. Specifically, a student evaluates a category by observing the marketplace performance of a few products from that category. If the product category shows potential (its products fair well in the marketplace competition), the student concentrates his effort and investment in that category. If the category evaluates poorly, the student hypothesizes new categories that he believes will produce better results and implements those revised designs in subsequent rounds.

Projects

In order to develop valuable products more quickly and efficiently, the student hypothesizes several product categories and searches within each one. The exploration of each hypothesized product category is called a project. In the MTS, a student will manage a portfolio of projects, deciding when to initiate new projects, when to cancel projects, and how to distribute his firm's budget among projects. Selecting product categories to search is an important decision. The product categories that a student focuses upon define his business.

Figure 13:
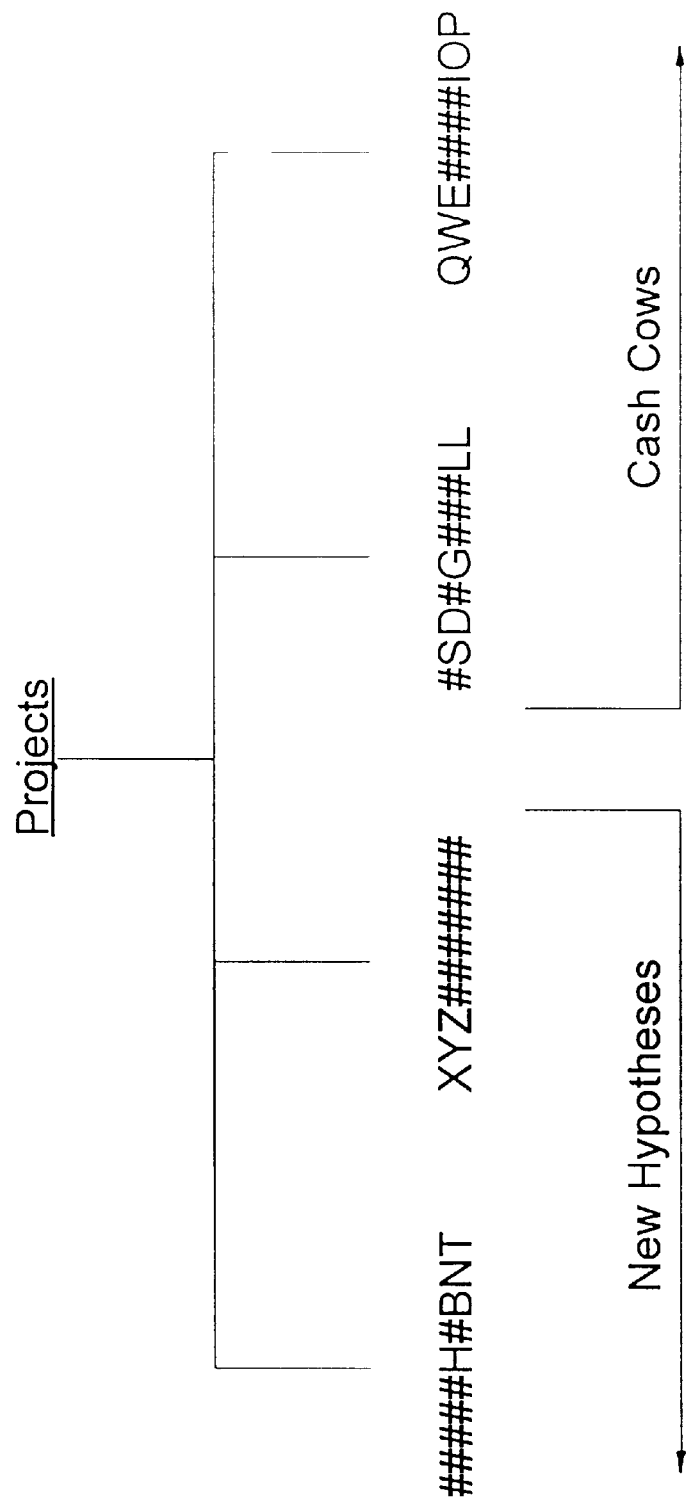
FIG. 13 depicts a student's portfolio of projects.

FIG. 13 depicts a firm's portfolio with projects defined upon qualitatively varying attributes; however, the portfolio can contain projects defined upon quantitatively varying attributes or other types of attributes. In this figure, product categories are defined by listing the characteristics that define a category and placing a number sign in the remaining attributes. The number sign indicates that these attributes are not part of the category definition. For example, (ABC#######) represents the product category where the letters A, B, and C are expressed in the first, second, and third attributes, respectively. The products (ABCYHUKMNR) and (ABCRDWSZGY) are members of this category.

FIG. 13 shows four projects. Projects (#SD#G###LL) and (QWE####IOP) are cash cows. They produce products that are successful in the marketplace. The student managing this firm exploits these product categories through production; they provide his firm's revenues. Although the student has two cash cows, competition compels him to search for higher value products. He must find higher value products more quickly and efficiently than his competitors or suffer a competitive disadvantage. Product categories (#####H#BNT) and (XYZ#######) are the student's hypotheses of product categories containing higher value products. Production from these projects will likely be small as the student focuses on evaluating these categories.

Perspective

Students do not randomly hypothesize product categories or randomly design products. Instead, they hypothesize product categories and design products after studying the marketplace results, for example, as may be provided in the marketplace database (see FIG. 11). In studying the marketplace results, students try to identify characteristics that contribute significantly to products' values. These characteristics can be identified by their appearance in products that are successful in the marketplace and their absence from products that are not successful in the marketplace. If a student desires information not provided by the previous marketplace results, he will experiment by manufacturing a small quantity of products and offering them to the marketplace. Having identified valued characteristics, a student will combine these characteristics to create products.

A student faces a difficult problem in analyzing marketplace information. The marketplace produces an enormous amount of information whether attributes vary qualitatively, quantitatively, or both.

To cope with the voluminous information, a student must select the information that is most effective and relevant to his business. He accomplishes this by evaluating only a few product categories. These categories might include, for example, the student's projects, potential projects, and product categories defining his competitors' products (as defined by the student). I call this set of product categories a student's perspective.

A perspective has the effect of categorizing the marketplace data. In doing so, it filters the market information, selecting the information that a student feels is most important. It is the means through which a student 'frames' the complex problem of competing, surviving, and profiting. It can be interpreted as a student's definition of the market. Different perspectives filter the marketplace results differently. Students with different perspectives will identify and miss different opportunities; evaluate product categories differently; and value information differently. Results that are surprising to one student might easily be anticipated by a student with a different perspective.

Innovation

Because students design products, innovation is defined in terms of product design. Specifically, an innovation is a product that differs from the previous products offered to the marketplace by at least one characteristic. A student's innovations will come from the product categories that he searches. Every product category possesses a unique distribution of product values. Because a student determines the product categories that he searches, he determines the distribution of product values corresponding to the innovations that he may produce. The student determines whether he searches a barren category or one pregnant with innovations. Moreover, a student changes the product categories that he searches as he gains knowledge. As a result, innovation is primarily a function of a student's development and application of knowledge—i.e., knowledge management. In stark contrast, innovation in prior art MTSs have relied upon exogenously determined sets of new product designs coupled with innovation probabilities and are essentially an investment decision where spending more increases the probability of designing a better products.

Short- and Long-Run Strategies

Innovating via perspectives and product categories creates a dilemma for students. A student can direct his efforts and investment towards product categories that the marketplace results have identified as most promising (categories that have done well in previous rounds). By exploiting this 'current' knowledge, a student immediately increases his firm's profits and the competitive pressure on his competitors. This is a short-run strategy. Alternatively, a student can take a long-run strategy and invest in discovering new product categories that contain higher value products (that is, new core competencies as described below). By developing new knowledge, a student can gain a large competitive advantage in future rounds. This requires time and investment, and there is a risk that no such product categories will be found. Balancing investment between these two alternatives is the quintessential knowledge management dilemma.

A Continuum of Innovations, Incremental through Radical

Using either the autocorrelation function with a specified product as a starting point, or by measuring the correlation between product categories, the present invention permits defining a measurable continuum of innovation types. Consider the product categories containing a significant number of the products offered to the marketplace in previous rounds. Incremental innovations are innovations from product categories that are highly correlated with at least one of these product categories. Radical innovations are innovations contained in product categories that are not correlated with these product categories. Innovation type is measured by these correlations.

Because the innovation measure can be defined as either changes in a product's design or as a comparison of product categories, this measure is relevant to students when they design products and study the marketplace results. If a new product is an incremental innovation, analysis of previous marketplace results provides a good prediction of the new product's value. Incremental innovation can rely primarily upon market analysis. In contrast, previous marketplace results are poor predictors of the value of radical innovations. Because of this, inventing a radical innovation requires testing new products in the marketplace. Compared to incremental innovations, they require greater time and investment. Their development also carries a greater risk of failure. With little guidance from previous marketplace results, students may not find any successful radical innovations.

Incremental and radical innovations have an obvious relationship to the problem of exploiting knowledge versus developing new knowledge with the short-run vs. long-run strategies. Investing heavily in incremental innovation is the exploitation of current knowledge. It is a short-run strategy. Investing in radical innovation requires developing new knowledge. It is a long-run strategy.

It is important to note that every product is a member of many product categories. A product presents a group of n characteristics to the market. The number of combinations of characteristics evaluated by the market is the number of sets that one can create from n objects. This number is $2^n$. Whether a student sees an innovation as incremental or radical, or to what degree in between, depends upon the student's perspective as well as on the new product. A student with a good perspective will be able to reduce the risks and costs of innovation.

Finally, it should be noted that by using correlation measures to choose a product value function, an MTS designer can change the relative number of incremental and radical innovation available for students when designing products. As value functions become less correlated, the MTS presents students with fewer incremental innovations and more radical innovations.

Technological Advance

A technological advance is simulated by restricting and then removing restrictions on the valid product designs. Depending upon the specific form of the attribute-characteristic representation, this may include restricting/expanding the domains of the attributes or the number of attributes. In the preferred embodiment, restrictions on the domains of attributes in products designs are applied and later removed. After a technological advance, multitudes of new products and product categories become available to students. Students compete by exploiting these new opportunities. Metaphorically, after a technological advance students can search new areas of the mountain range. Formally, after a technological advance, students can search new volumes of the multidimensional product space. Students will have to develop new definitions of the market (new perspectives) and new definitions of their firms' businesses (new product categories). In extreme cases, students will have to 'reinvent' their firms. This requires developing new knowledge while shedding the knowledge made obsolete by the technological advance.

Measurability of Information

One of the important properties of the present invention is that information can be measured. There may be several measures, each useful for a different purpose. Two important measures are the reliability of information and population statistics. In the case of qualitatively varying attributes the new method is combinatorial and is congruent with the mathematics of information theory.

To understand the measure of information reliability, consider the task of product design. In determining product designs and in hypothesizing product categories, students might use their knowledge of the value of products in a category to predict the values of products in other categories. To borrow a real world example, "What do strong sales of sports cars indicate about the values of utility vehicles?" Alternatively, students might use their knowledge of the value of a single product to predict the effects of design changes to that product. In either case, the reliability of information measures this predictive capacity. It is given by the appropriate correlation measure: the autocorrelation function or the correlation between two product categories.

The measure and usefulness of population statistics can be understood by considering the students' task of evaluating a product category. In the terms of statistics, the products that are evaluated in the marketplace competition are samples from a population (the products in a product category). The students' evaluation of product categories via marketplace results is similar to a statistician's evaluation of a population via sampling. Because of this similarity, population statistics apply to analyze how students choose products to send to the marketplace (how students sample the population). In addition, population statistics apply to provide objective measures of the values of products in a product category (for example, confidence intervals). These objective measures are compared to a student's subjective estimates to identify biases in the student's judgment.

Other Important Properties of Information

By modeling the product space in accordance with the invention, several significant properties of the information produced include:

1. The marketplace produces an enormous amount of information (as described above).
2. A student does not have enough of the information he desires. Marketplace results only estimate the values of products contained in a product category.
3. The firm's budget does not permit exploring all choices. Based upon limited information, a student can only investigate a few product categories. This makes success a matter of probability.
4. Product offerings produce both revenue and new information, and generally do so in an inverse relationship. That is, products that generate revenue produce little new information and products that produce new knowledge initially generate little revenue.
5. For every type of innovation, incremental through radical, previous marketplace results possess the proper reliability of information.

Explicit Representation of Knowledge

Product categories and perspectives provide a basis for categorizing products and information. In both cases, the categorizations are structures that embody knowledge.

Product Categories

Hypothesized product categories determine the innovations a student might design (it is the product space where he looks). They determine—from a probabilistic viewpoint—the efficiency of a student's search for valued products.

Stronger knowledge (product categories containing higher valued products) permits discovering (1) valued products with less investment or (2) higher valued products given the same investment. Through product categories, knowledge promotes efficient innovation.

Perspective

Perspectives select the information from the marketplace database that evaluates product categories. Comparatively, stronger knowledge (a perspective that includes product categories which differ greatly in their products' values) can separate high value product categories from low value product categories with less information or provide a better prediction of product categories' values given the same amount of information. Stronger knowledge (1) reduces risk because students have superior identification of high value product categories and (2) reduces the investment needed to find high value product categories. Through perspectives, knowledge reduces the risks and costs of doing business. In both cases, stronger knowledge means being able to more efficiently focus one's resources to satisfy the marketplace.

Core Competencies

When searching a product category, a student learns the valuable combinations of characteristics for that category (the characteristics that the '#' attributes shown in FIG. 13 should express). With this knowledge, the student can efficiently improve his products' designs. In the mountain range metaphor, the student is learning the topology of one area of the mountain range. When this situation exists, the student has developed a core competency.

One can record the development of a student's core competencies through statistical measures (measures of central tendency and variation) of the products that the student offers the market. For a set of products, one can measure a core competency with the vector $(A_1, A_2, \ldots, A_n, \text{Var}, \overline{V})$. In this vector $A_1, A_2, \ldots, A_n$ is an archetype product. Its characteristics are the characteristics represented most often in the set of products. Specifically, for qualitatively varying attributes, $A_i$ is the characteristic expressed most often by the $i^{th}$ attribute. For quantitatively varying attributes, $A_i$ is the average value of the attribute. The variable Var measures the deviations of the actual products from the archetype. For quantitatively varying attributes, one can measure these deviations with a calculation of variance. In the qualitative case, one must first quantify the deviations. One can accomplish this with the concept of Hamming distance. The Hamming distance between two products is equal to the number of characteristics by which the products differ. For example, the Hamming distance between products (QWERTYUIOP) and (QWERTYUMNB) is three. In the case of qualitatively varying attributes, the variable Var is equal to the average of the Hamming distances between products in the set and the archetype product. The variable $\overline{V}$ represents the average value of the products in the set.

Figure 14:
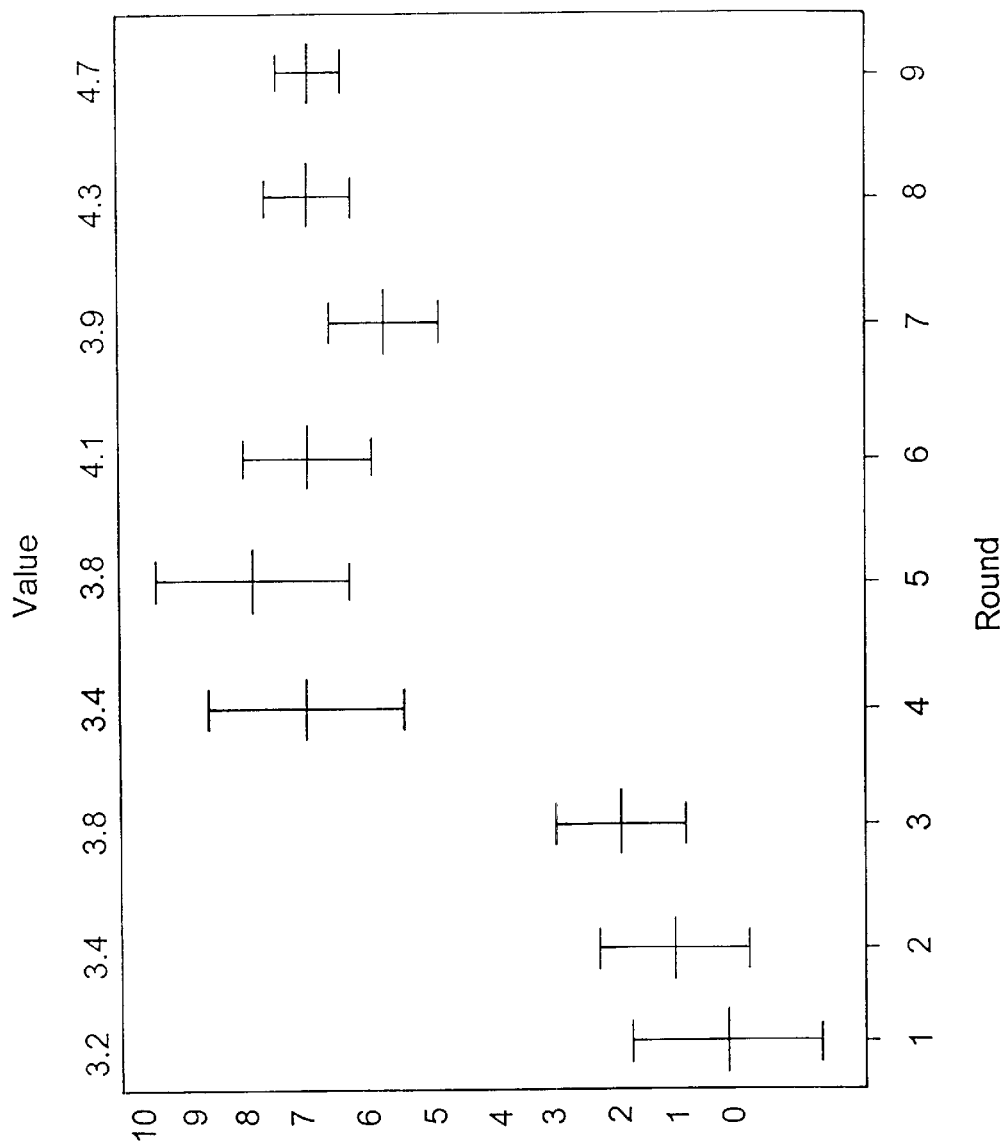
FIG. 14 depicts a measurement of a student's development of a core competency.

One can apply this measure of core competency to any set of products (for example, the products produced in a project, by a firm, or by all firms in a round of the learning session). By repeating this calculation over several rounds, one can track the evolution of core competencies. FIG. 14 depicts this application. The horizontal axis indicates the round. The vertical axis indicates amount by which an archetype product differs from the archetype product in round one (the Hamming distance in the case of qualitatively varying attributes). The figures progressing across the graph represent the core competency measure $(A_1, A_2, \ldots, \text{Var}, \overline{V})$. The center bar of the figure represents the archetype. The span of the figures represents the variation in products, Var. Above each figure along the top of the graph is the average value of the set of products, $\overline{V}$.

FIG. 14 shows considerable movement in the development of a core competency. The large change in archetype between periods three and four suggests that the student has changed his focus to a new product category. The decrease in variation after round five indicates that the student has begun focusing upon production rather than search. A student would do this when he finds high value products. The chart can also be considered a learning curve for learning to produce high valued products.

Industry Life Cycles

Economists and technological historians have researched the birth, development, and demise of industries. They found that most industries develop through a three stage pattern called an industry life cycle (the automobile, commercial aircraft, and the minicomputer industries are just a few examples). James Utterback's book *Mastering the Dynamics of Innovation* (Boston: Harvard Business School Press, 1994) describes industry life cycles in detail (see chapter 4). As a brief review, industry life cycles progress as follows:

1. Fluid Stage: An industry begins in the fluid stage. Many new firms enter and the number of firms operating in the industry increases. Radical product innovation and diverse product designs abound. Market share and profits change unpredictably. The profit margins of successful products are large. Technical and marketplace uncertainty are pervasive. The market's previous results poorly predict the industry's development.

2. Transition Stage: As an industry develops, uncertainty decreases and the industry enters the transition stage. Technologies and applications stabilize and product standards emerge. Incremental innovation becomes more important. The industry consolidates as waves of business failures and mergers sweep the industry. Only a handful of firms survive.

3. Stable Stage: Eventually an industry enters the stable stage. Market shares are relatively fixed. Innovations are incremental. Standard marketing, finance, and management analyses identify market changes, guide strategic planning, and predict the consequences of a firm's actions. Competition is over price, profit margins are slim, and prices reflect production efficiency. (Prior art MTSs are useful for simulating markets in the stable stage, but not in the fluid or transition stages). The industry remains in the stable stage until a technological breakthrough initiates a new life cycle.

In accordance with the invention, a technological breakthrough can initiate an industry life cycle when either the domains of the attributes or the number of attributes is increased. Initially, the most valued products that firms can produce are restricted to have sufficiently low values. The students compete with these choices. Innovation will decrease as students find the most valued products in this limited set. Once this occurs, the domains of one or more attributes or the number of attributes is increased, thereby simulating a technological advance. This will initiate an industry life cycle.

Two Improvements in MTSs:

1. An MTS with Superior Modeling of Competitive Industries

In a competitive industry, MTS students guide a firm through a transition from a predecessor industry to a new industry. Such a transition simulates a technological breakthrough and concomitant displacement of an older technology (for example, the transistor destroying the market for vacuum tubes). By producing and using knowledge, students construct and adjust a portfolio of projects. Students must (1) define the market as the new industry develops; (2) build new core competencies and design new products; (3) protect against both short-run and long-run competitive threats; and (4) develop managerial rules appropriate for the industry's maturity (fluid, transition, and stable stages). Among other lessons gained by engaging in the simulation of a technological breakthrough, students learn the following:

The Management of Innovation

The process of innovation is unique among business functions. For descriptions of the characteristics of innovation and guidance on managing innovation see: Peter Drucker, *Management: Tasks, Responsibilities, Practices* (New York: Harper Collins, 1973) p. 782–803; Peter Drucker, *Innovation and Entrepreneurship* (New York Harper & Row, 1985) p. 143–176; Donald Frey, "The New Dynamism (Part 1)," *Interfaces,* vol. 24 no. 2 (March–April 1994): pp. 87–91; James Brian Quinn, "Managing Innovation: Controlled Chaos," *Harvard Business Review* (May–June 1985): pp. 73–84; and Lowell Steele, *Managing Technology: The Strategic View* (New York: McGraw-Hill, 1989): pp. 263–288. The most startling characteristic of innovation is its unpredictability. The successful application and design of a radical innovation, for example, is rarely predictable at the start of its development. This unpredictability is the source of four other principle characteristics of radical innovations:

1. High Failure Rate: Even with proper management, only a small fraction of innovative ideas become innovations.

In the present invention, the fraction of successful innovations (successful new product designs) will vary with the type of innovation that a student pursues, the fraction of products with values higher than the products previously sent to the marketplace, and the intensity of competition in a learning session.

2. Path-Dependency

Innovation is path-dependent. Path-dependency means that (1) some paths of change will not get from state A to state B while others will and (2) the actions one takes today determine the choices one faces tomorrow (history matters).

The mountain range metaphor provides a striking display of path-dependency in the present invention. A student's sequence of product designs produces a 'path' winding across the product space. The knowledge a student develops and the direction he 'travels' depend upon the path that has been previously traversed (history matters). Moreover, the portion of the product space's topology that is correlated with a students knowledge need not contain products that are competitive in the marketplace (not all paths lead to success). Techniques such as the previously described method of measuring core competencies provide means of measuring and displaying the 'paths' of students' product development.

3. Surprise: Along the path to success, or failure, lie unpredictable obstacles and beneficial 'tail winds.' These events surprise management.

In the current invention, frustration produces this quality. Attributes that a student does not focus upon in his marketplace research can be highly interactive. A change in one of these attributes, in a student's or competitor's product designs, will significantly affect product value and marketplace competition. Since the student is not focusing upon the attribute, these results will be surprising to the student.

4. Probabilistic Success: When making decisions, there are always more options than resources. Compounding this difficulty, there is never enough information to confidently determine the best options. This situation makes success a matter of probability.

In the current invention, a firm's budget will not facilitate sampling from all of the product categories that the student deems potentially profitable. In addition, marketplace results only estimate the values of products contained in a product category. Because of this, a student does not have enough of the information he desires.

Because the present invention reproduces each of these properties, students using an MTS in accordance with this aspect of the invention can experience and learn the characteristics of innovation. Students can also learn rules for managing innovation. At a most general level, the rules for managing innovation are as follows:

Market Focus

To be successful, an innovation must make an impact outside of the firm. It must affect a market.

Pursue Multiple Projects

At the start, each project looks equally inviting (or crazy), yet few succeed. To reduce one's risks, one must invest in multiple projects.

Match Investment to Knowledge

To further reduce risk, one should start an innovation project with small investments and only increase investment as uncertainty is reduced and information becomes more reliable.

Aim High

The successful innovation must pay for itself and several failures. In cases of substantial technological change, it will also provide the foundation of a company for many years. It is imperative that all innovations seek substantial success and aim for market leadership.

Innovation Requires its Own Measures

The tools used for managing a mature business are unreliable when applied to innovation. How can one calculate NPV when the design and application of an innovation is unpredictable? Moreover, the dynamics of innovation differ from that of the mature business. Five percent annual profit increases are unrealistic. Instead, there will be a period where there are no profits and, if successful, an ensuing period of rapidly increasing profits. Instead of using the accounting and control measures of mature businesses, one manages innovation projects through expectations and feedback. Expectations can always be defined and used to direct efforts—even when forecasting is unreliable.

Manage Innovation Separately from the Mature Business

When compared to the mature business, innovation projects appear inconsequential. They produce little or no revenue. Results and problems in these projects do not immediately affect a firm's performance. Though their immediate results do not impact the firm, innovation projects require valuable resources. For this reason, managers may not dedicate enough resources to the innovative project. For all these reasons, innovative projects must be managed separately from the mature business.

These rules contribute to success, but they are not sufficient. Implementing these rules requires judgment. Managers must determine which projects should be started, which, and when, projects should be cancelled, and determine when the firm should adjust its investment in a project. Managers must set aspiration levels; balance the risk of falling victim to a competitor's innovation with the risk of losing their investments in innovation; and negotiate the trade-off between flexibility and decision errors. With the present invention students develop this judgment as they face these dilemmas in the MTS.

In learning these lessons, students will also confront and learn to manage, by interacting with the business situation through the user interface, the following issues:

Balancing the Risks of Lost Investment and Lost Opportunity

The risks of lost investment and lost opportunity are antithetical, as are the costs of their associated mistakes. How should a firm balance the current and future needs of the business? How does a firm maintain efficiency while also maintaining the flexibility that competition requires of the firm?

Managing in a Dynamic Industry

How much can a firm affect an industry's dynamics? How does one compare results to expectations when much of this analysis rests upon judgment? How does one evaluate a firm's wealth producing potential?

Portfolio Management

How many projects should a business pursue? How much diversity is advantageous, and how does diversity link to core competencies? What are good measures of innovative performance? How well do traditional financial calculations govern (for example, payback period, NPV, and ROI)?

Managing Change

How fast can a firm change its operating rules, core competencies, and product mix without endangering its survival? What kind of rules and measures result in change rather than stability? What rules effectively move resources from old opportunities to new ones? At what level of detail should one plan?

2. Personalized Decision Analysis and Training

Prior art MTSs teach through an indirect method. A student tries various strategies, analyzes the results, and, hopefully, the MTS induces an improved understanding. This method of learning can be ineffective because a student learns only as well as he can invent strategies and induce lessons. In contrast, a direct method of teaching in accordance with another aspect of the invention analyzes a student's decisions and judgments in order to determiner his unique, habitual judgment and decision strengths, errors, and biases. This cognitive analysis facilitates personalized training in critical thinking and business decision-making.

Potentially, MTSs are the ideal means of providing cognitive analysis and training. They present a student with well-defined problems and information that results in the receipt of well-defined answers. While necessary, these characteristics are insufficient. In order to provide personalized decision and judgment analysis, MTSs must meet two additional requirements. First, their design must facilitate measuring information and knowledge. Second, they must clearly relate the tasks demanded of students to cognitive functions that can be analyzed. Prior art MTS do not satisfy either of these two additional criteria. The present invention satisfies both of them.

The present invention's means of measuring information and knowledge was described above. The present invention also clearly relates the tasks that it demands of students to cognitive functions. To understand the relationships, it is useful to recognize that in designing products students are actually competing to solve a complex optimization problem. Instead of using a scientist's powerful mathematical algorithms for this task, students use their own 'cognitive' algorithms. In doing so, students exercise three cognitive functions: covariation assessment, categorization, and judgment. The relationships between the students' tasks and these cognitive functions are described below.

Covariation Assessment

When students analyze the marketplace data, they are searching for correlations between combinations of product characteristics (product categories) and marketplace success. In cognitive psychology, this process is called covariation assessment. Experiments have tested peoples' covariation assessment in a variety of situations.

In one such experiment, subjects were shown several lists of paired variables and asked to estimate the correlation demonstrated in each list. Dennis Jennings, Teresa Amabile, and Lee Ross, "Informal Covariation Assessment: Data-Based versus Theory-Based Judgment," in *Judgment Under Uncertainty: Heuristics and Biases,* edited by Daniel Kahneman, Paul Slovic, and Amos Tversky (New York: Cambridge University Press, 1982): pp. 211–230. This task is similar to students' analysis of marketplace information in the present invention. In the present invention, the paired variables are products and sales volume. The psychological experiment shows dramatic results. Subjects' estimates vary widely and, on average, greatly underestimate correlation. Correlations must be at least 0.8 before subjects, on average, estimate a correlation as high as 0.5. These results occur because subjects simplify their task by looking at only a few entries on the list. Correlation is a quality of the entire set, and only exceptional rows accurately convey this quality.

This study suggests that when market results do not make facts obvious, managers can be easily mislead by focusing their attention on a small set of information (for example, the striking success, the striking failure, firsthand experience, or benchmarking). With the present invention, this error can be recognized by the system, explained to the student in a report or other output, and corrected by the student to better avoid real-world errors. When market uncertainty exists, managers should rely more heavily upon decision rules and conduct a broad assessment of their firms' industry.

Another method that students might use to identify profitable product categories is to count the number of successful and unsuccessful products in a category. Psychological studies have also researched this method of correlation. Dennis Jennings, Teresa Amabile, and Lee Ross, "Informal Covariation Assessment: Data-Based versus Theory-Based Judgments," in *Judgment Under Uncertainty: Heuristics and Biases,* edited by Daniel Kahneman, Paul Slovic, and Amos Tversky (New York: Cambridge University Press, 1982): pp. 211–230. With this method, the information available to students can be placed in 2×2 matrix, as shown in FIG. 15. (In keeping with the preferred embodiment, FIG. 15 shows a product class for the case of qualitatively varying attributes. FIG. 15 could easily be expanded to also illustrate other types of attributes). When assessing correlation from these types of tables, people typically use only a fraction of the information in the table. Most people either look at the number of counts in the upper left-hand quadrant (the yes-yes quadrant) or look at the counts in the top row. These two strategies can produce error. A proper assessment of the correlation requires using the information in all four quadrants of the contingency table (for example, comparing the fraction of successful products that are members of a category to the fraction of successful products that are not members of the category). By outputting contingency tables for the student to use and review, the present invention can teach students to use all of the product category information available to them (given their perspective). It can also illustrate the decision errors and the consequences of these errors that arise from using only partial information through the contingency table, shown above or in combination with a report or other output.

Categorization

Categorization is a technique commonly used by people to simplify their environment. This is exactly what a student does when he hypothesizes product categories and a perspective (defining his business and the market). A student's categorization will have a dramatic affect on his performance. To see this, suppose that each student associates each project within his portfolio with an estimate of its potential for producing profits. This estimate can be represented as a probability and updated each round. Different categorizations will incorporate marketplace results differently. Because of this, students' expectations will evolve differently even though they view the same marketplace results. This will lead to different assessments of opportunities and risks and different actions. With the present invention, one can analyze how students form and change their categorization schemes by tracking the product categories and perspective used by the student in each round and how students' categorizations and other decision-making choices affect their management decisions.

Judgment

During the course of a learning session a student must make the following project management judgments: the value of the products in a product category; the costs and time required to find valuable products; and the reliability of information. The student must also judge his portfolio's risk, capital requirements, and potential for producing profitable returns. Finally, a student must also assess his level of confidence in his judgments. Each of these judgments can be input into the model through the user interface.

In each round of a learning session, one can solicit each of these judgments from a student. Furthermore, for each of these judgments, one can estimate the true value by calculating correlations between product categories and utilizing population statistics. From these values, the MTS administrator can identify which of the student's judgments are habitually erroneous. The administrator can also investigate how these errors affect a student's project and portfolio management. With a suitable definition of risk, one can perform an analogous analysis of a student's risk management.

Judgment analysis can address both a student's decision making and the impact of his decisions on his firm. It can address the following questions:

How does the manager recognize and account for uncertainty, information of varying reliability, surprises and errors, and variation in performance?

How do knowledge, information, risk, and competition influence the manager's aspiration levels; assessment of opportunity, risk, and potential returns; and allocation of resources?

Are the manager's aspiration levels and resource allocations consistent? What causes convergence or divergence of aspirations, expectations, and actions?

How do the manager's decisions and judgments influence his business's capital requirements, risk, return, and adaptability?

Does the manager correctly judge his firm's influence on its industry?

In addition to addressing these questions, an advanced judgment analysis identifies and corrects errors which are typical human thinking, such as biases from anchoring, overconfidence, honoring sunk costs, and scenario thinking. For a description of these biases see the appropriate chapters of: Robyn Dawes, *Rational Choice in an Uncertain World* (USA: Harcourt Brace Jovanovich, 1988); and Daniel Kahneman, Paul Slovic, and Amos Tversky, editors, *Judgment Under Uncertainty: Heuristics and Biases* (New York: Cambridge University Press, 1982).

The following two examples illustrate decision errors that an MTS in accordance with the invention identifies and corrects:

The Error of Overestimating the Likelihood of Contingent Events

Suppose that developing a new core competency requires developing new knowledge in four stages, each a stage developing upon the previous one. Specifically, a student using the present invention will first discover a good product category and then 'fine tune' the product design in three stages. Each stage will identify good characteristics for the '#' attributes.

Suppose that the firm has a 75% chance of successfully completing each step of the task. The firm has approximately a 32% chance of success ($0.75^4$=0.316). Because the firm will discover the combinations in succession, one can treat these discoveries as independent, conditional probabilities. Let A, B, C, and D stand for the first, second, third, and fourth discovery of valuable combinations of characteristics. The probability of success is therefore prob(D)=p(A)*p(B|A)*p(C|B)*p(D|C).

Psychological studies of anchoring suggest that people overestimate the chance of success by as much as about 70%. This overconfidence can impact a firm by causing its managers to (1) bet on too few projects rather than building a diversified portfolio and (2) invest in projects long after development suggests that failure is nearly unavoidable.

The Influence of Sunk Costs on Judgment

All firms face two antithetical risks: lost opportunities (that competitors might exploit) and lost investment. Technological and market opportunities and competitors' strategies determine which risk dominates. In an effort to justify and honor previous, unrecoverable financial and psychological commitments (sunk costs), a manager might resort to adverse behavior, including (1) decreasing his estimate of the risk associated with previous commitments; (2) increasing his estimate of the benefits of previous commitments; and (3) utilizing selective attention. (Selective attention highlights information that supports one's position while dismissing contrary evidence). These effects promote resistance to change. Executives forgo profitable opportunities and unknowingly expose their firms to excessive risk.

OTHER APPLICATIONS

Figure 16:
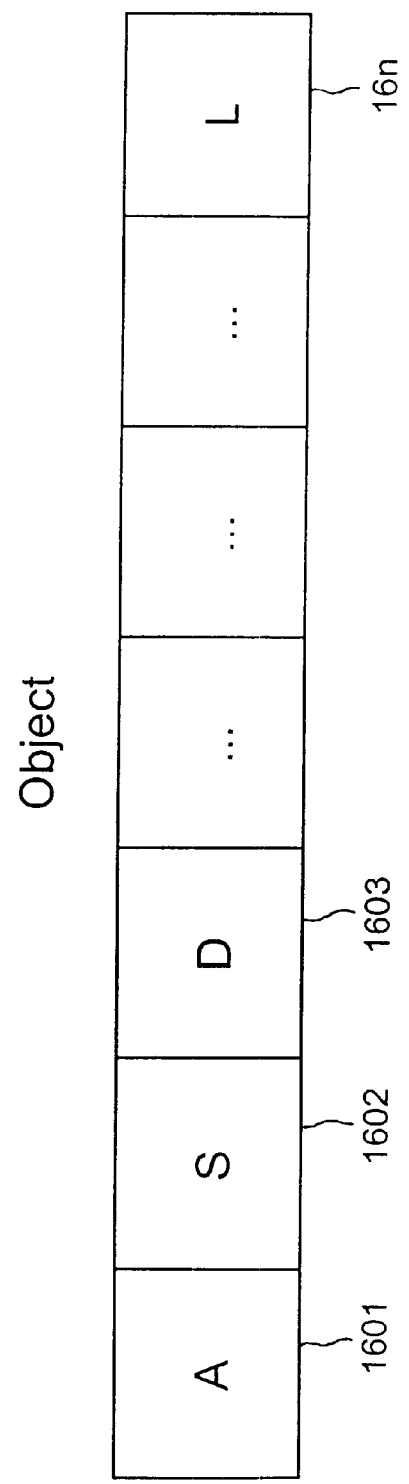
FIG. 16 illustrates an object in the present invention.
Figure 17:
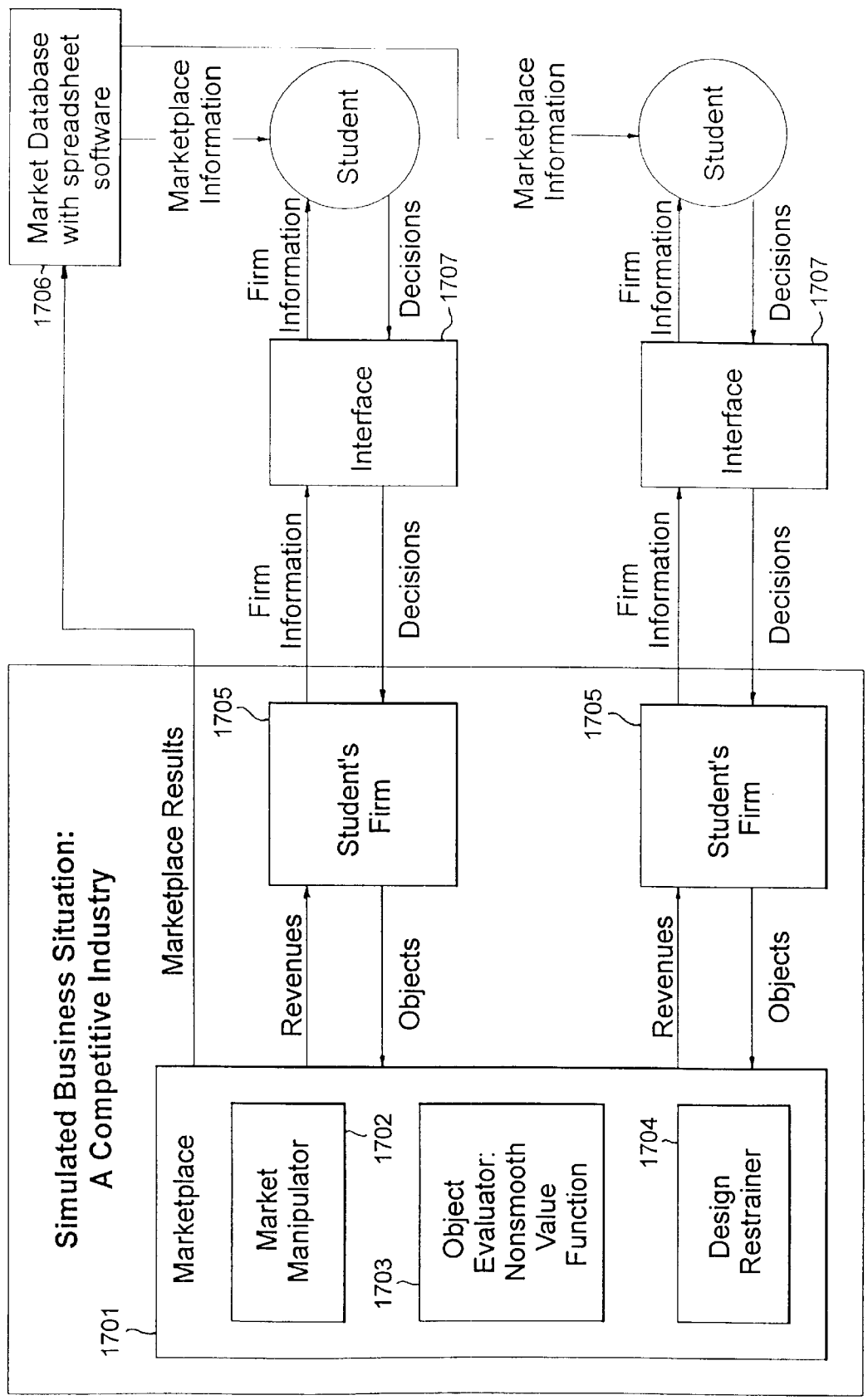
FIG. 17 is a block diagram illustrating the architecture of a competitive industry MTS in accordance with the present invention.

Those skilled in the art will appreciate the many variations of the MTS of the preferred embodiment. Though each variation requires some changes to the system described above, each such construction and operation is fundamentally the same. Some of these variations include:

1. For some multipeaked functions, one can use charts and/or a calculator. This makes possible the use of the present invention in business simulation board games.
2. One can enlarge the system presented above by: (1) including additional product traits (for example, business process traits); (2) having the computer simulate competitors; (3) modeling sophisticated financial markets, manufacturing, marketing, and/or accounting; (4) and/or by including supply curves for capacity and/or product characteristics.
3. The object designed by students and sent to the marketplace need not be a product. For example, it could be an advertisement which is sent to the market and whose success is then gauged. FIG. 16 provides an illustration of such an object, having n qualitative attributes. FIG. 17 illustrates a block diagram of a simulated competitive industry for testing designs of objects in general.
4. In addition to expanding the valid object designs (simulating a technological advance), one can restrict the valid object designs in order to represent shortages of component parts or government regulations.
5. One can include market disturbances by letting a portion of the product attributes represent factors influencing the market. Students do not view these attributes. By intermittently changing the characteristics expressed by these attributes, one simulates shocks to the marketplace. Shocks can range in 'size' from incremental to radical. Students must adjust their product designs and business strategies in response to these shocks, which have the effect of deforming the topology of the product space that students search. Alternatively, the multipeaked value function itself can be automatically changed whereby one or more values of the set of valid object designs in the management training simulation is altered. In either case, this means that student's are searching a changing value function. This application is significant because it shows that the present invention also applies to value functions that change throughout the simulation (for example, in response to changes in macroeconomic parameters, consumer tastes, or other shocks to the simulated industry).
6. A portion of the attributes can describe products while another portion describes customers' applications of a product (call these attributes application attributes). Interactions between product attributes and application attributes represent the effect of product changes on the application and the effect of using an existing product in a new application. Several variations arise from this formulation.
    6.1. Customer groups seeking products for different applications provide a means of representing distinct market segments.
    6.2. The MTS can intermittently change the characteristics expressed by the application attributes. This simulates changes in customer needs. Students must adapt their firm's products to these changes. Changes can vary in 'size' from incremental to radical. These changes can be determined by a program in the MTS or by the MTS simulating customers who 'autonomously' develop new applications.
    6.3. Students can search for both new products and new applications for products. Students will manage both product research and market development.
    6.4. By combining elements of the enhancement just described (market segmentation, developing new applications), MTSs can more realistically simulate industry life cycles. For example, after a technological breakthrough, firms often must invent applications and educate customers to the benefits of these possibilities.
7. One can let several students control a firm and divide a product's attributes into several groups (for example, attributes one through five, six through ten, and eleven through fifteen). Each student designs one segment. Interactions between attributes represent the impact of one student's decisions on other student's design. To design high value products, students must coordinate their efforts and work as a team.
8. The present invention can teach coordination and teamwork by having a team of students control a firm. Some students set 'corporate' strategy (design the general characteristics of the firm's portfolio and determine finding for projects) while other students propose projects and design products. To teach the importance of information and communication, one can limit the communication between the two groups.
9. One can let several firms develop a product, each determining different attributes. This arrangement offers several MTS possibilities including the following:
    9.1. Different firms control different functions involved in bringing a product to the marketplace. For example, one firm determines the attributes describing a product's design, another determines the attributes describing advertising, and a third determines the attributes describing sales strategy.
    9.2. Groups of attributes can represent components of a product (which might also be divided into components). Each firm makes one component. In efforts to produce the final product, firms must either purchase other components, form alliances, or diversify their manufacturing.

The above detailed description of the invention, preferred embodiment, two improvements, and other applications section, describe incorporating a new method of representing innovation, a new method for producing properties of information and knowledge, and a new method of making information and knowledge measurable in competitive industry MTSs. Those versed in the art will recognize that one can incorporate these inventions in a variety of MTSs including the 'general case' MTS depicted by FIG. 18. By incorporating the attribute-characteristic representation and the multipeaked value function into 'general case' MTSs, these MTSs will gain the properties of information and knowledge and the direct association of decision making with cognitive processes.

Figure 18:
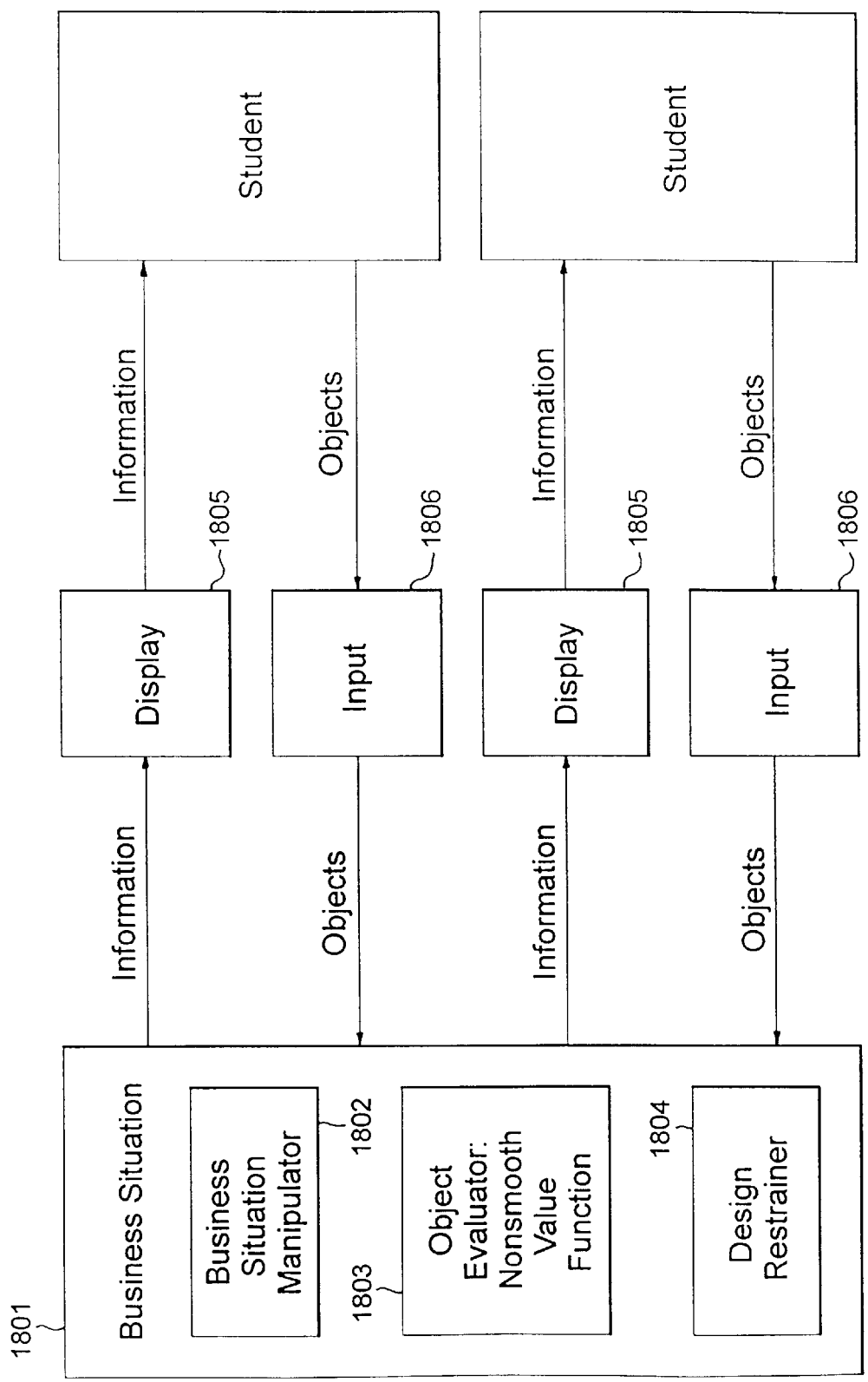
FIG. 18 is a block diagram illustrating the architecture of a 'general case' MTS in accordance with the present invention.

FIG. 18 depicts a 'general case' MTS of the present invention. Students participate in a simulated business situation 1801. Students receive information about the business situation via a display 1805. Based on their assessment of this information, students design objects. The objects are represented with an attribute-characteristic representation. Students input their object designs into the simulated business situation through an input device 1806. The simulated business situation evaluates the objects with a multipeaked value function 1803. A business situation manipulator 1802 takes the objects' values and calculates and objects' effects on the business situation. The results of the effects are displayed to the students through a display device 1805. During a learning session, if desired, a design restrainer 1804 can restrict and/or expand the range of valid object designs.

This arrangement depicted in FIG. 18 can apply to a wide variety of business situations. These possibilities include:

1. The simulated business situation may include a simulated factory. In this case, the object desings are machines. The object values are the machines' capital to output ratios (or capital to labor ratios). Students design machines in an effort to invent more efficient machines and decrease manufacturing costs. The business situation itself can be simulated with two methods. One can simulate the factory with a set of equations. For an example of simulating production with equations see: Steven Gold and Thomas Pray, "The Production Frontier: Modeling Production in Computerized Business Simulations," *Simulation and Games*, vol. 20 (September 1989): pp. 300–318. Alternatively, one could simulate the factory with one of the many software packages made for simulating factories and production lines.

2. The simulated business situation is a competition between design teams. Students design a product. Given a predetermined number of trials, students compete to develop the best design. In this case, there is no market. Instead, the display shows students their designed products and the associated product values.

Figure 19:
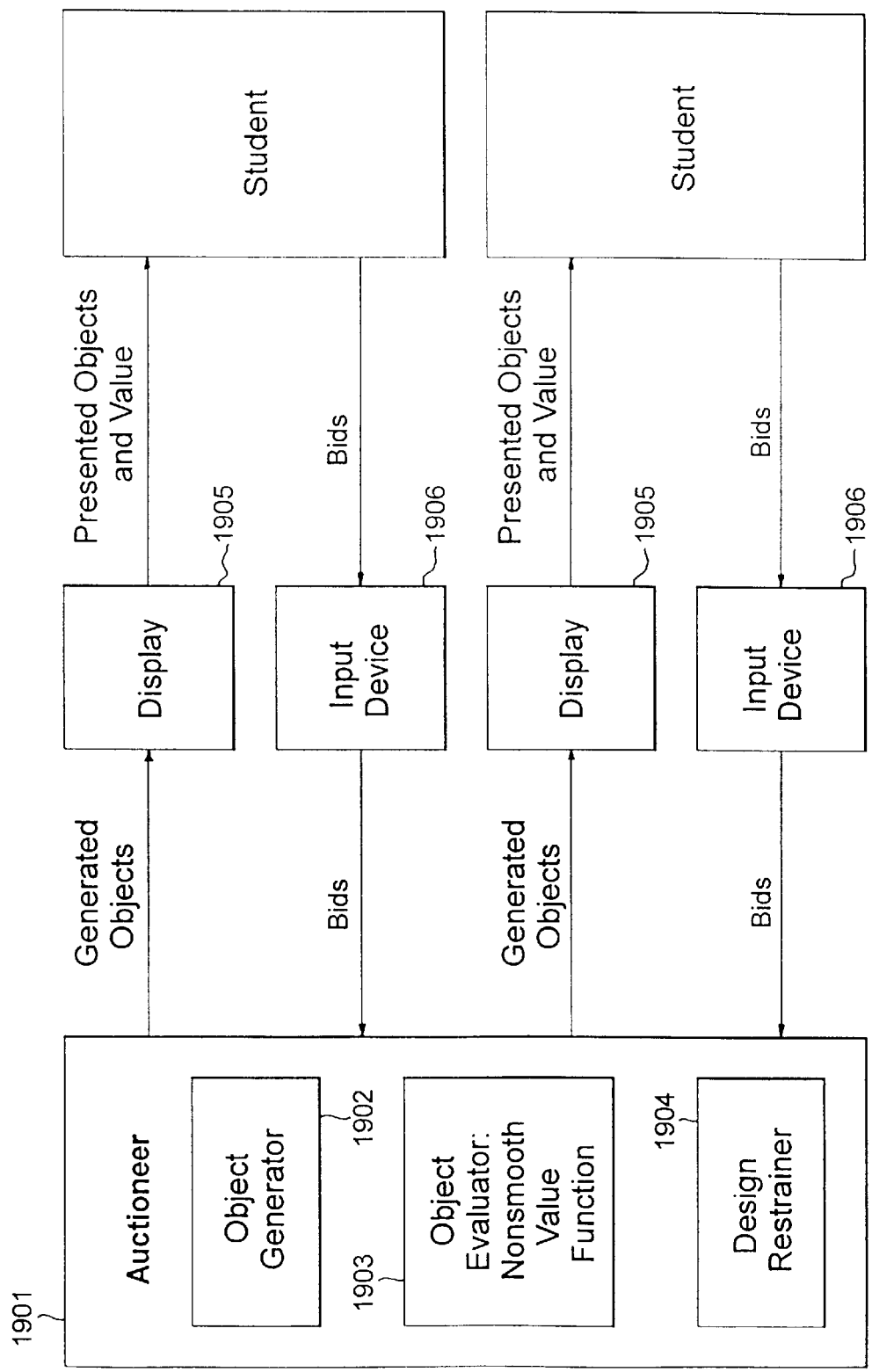
FIG. 19 is a block diagram illustrating the architecture of an auction MTS in accordance with the present invention.

FIG. 19 presents another MTS based upon representing objects with an attribute-characteristic representation and evaluating objects with a multipeaked value function. This is the case of an auction. In the simulation of an auction, the 'auctioneer' 1901 creates objects 1902 and evaluates these objects with a multipeaked value function 1903. The display 1905 shows students the generated objects. Students bid for these objects, with the highest bid receiving the value of the object. The goal of students is to accumulate the most value. If desired, one can provide a design restrainer 1904 for restricting and expanding the valid object designs.

Figure 20:
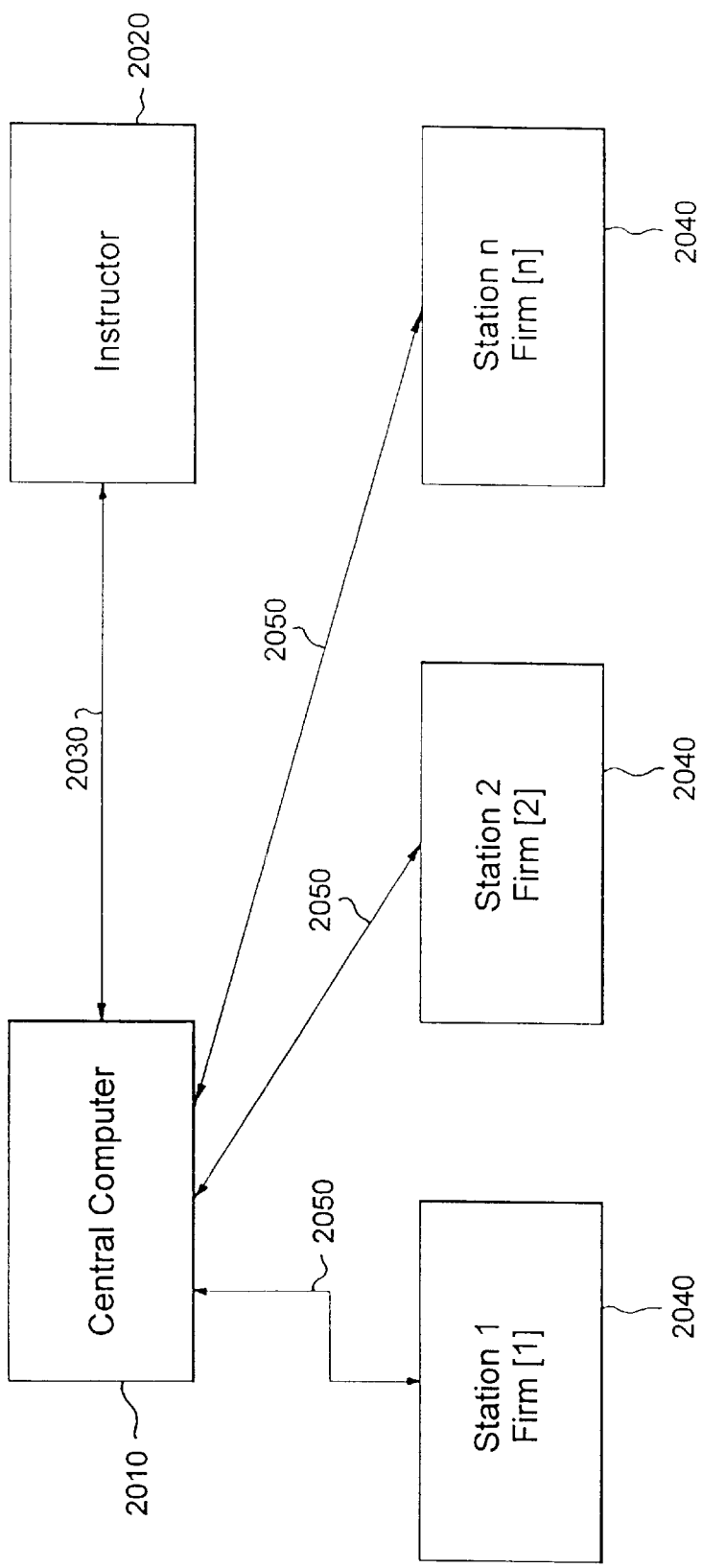
FIG. 20 illustrates a hardware arrangement for implementing the present invention.

With reference now to FIG. 20, a hardware arrangement 2000 is illustrated including a central computer 2010 which is preferably configured to run a program which implements the system and method of the present invention. An instructor or leader responsible for running the simulation connects to the central computer through a main station 2020, for example, using a personal computer having a graphical interface suitable for entering the various inputs and displaying the outputs of the system.

The main station 2020 communicates with the central computer 2010 via a communication link 2030, for example, a modem or dedicated communication line. A plurality of stations 2040 are also connected to the central computer through respective communication lines 2050. Each station 2040 preferably comprises a personal or laptop computer such as one owned by the participant in the simulation. Preferably, each firm in the simulation (e.g., management training simulation) is controlled at one station 2040; however, a single station or user can control plural firms, or multiple stations can share responsibility for governing the activities of a single firm within the spirit of the present invention. The hardware arrangement 2000 of FIG. 20 illustrates a preferred arrangement in which each firm [x] is controlled by a respective station [x].

Figure 21:
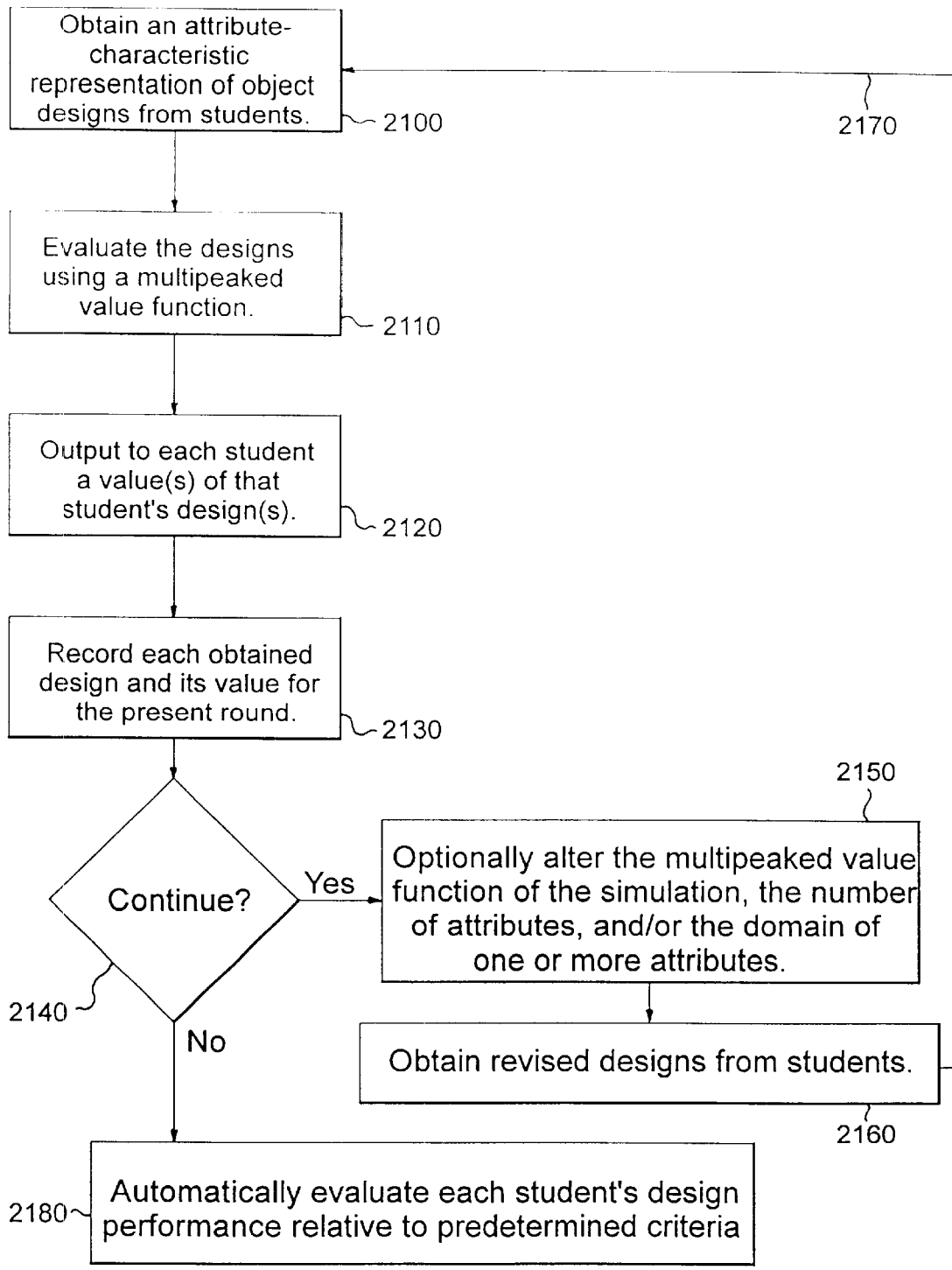
FIG. 21 illustrates a process flow for evaluating a student's design.

In accordance with one aspect of the present invention, the MTS can automatically evaluate the performance of a particular student's design or designs relative to predetermined criteria such as other student designs or bench mark levels established statistically or otherwise. With reference now to FIG. 21, a process flow for evaluating a student's design is described. The evaluation analyzes judgments made by the student as reflected in their object designs and changes from round to round made by the student as reflected in their object designs and changes from round to round in view of the information they obtain from the database and the filters they used. During the course of the simulation, the participant makes project management judgments, including, but not limited to, the value of the products in a product class; the costs and time required to find valuable products; the reliability of information; and his level of confidence in his judgments. They system monitors these judgments by analyzing forms submitted electronically. Each round of the simulation, one can solicit each of these judgments from a student. Furthermore, for each of these judgments the simulation can estimate the true value by sampling products and calculating correlations. For these values, the simulation administrator can identify which of the student's judgments are erroneous.

At step 2100, the system obtains an attribute-characteristic representation of one or more designs from each of the students participating in the simulation. Such designs are obtained by completing a form that preferably is presented electronically on the display screen at the stations 2040. For example, a user interacts with the various fields displayed through the interface illustrated in FIG. 12 and adjusts product design and capacity by submitting to the central computer (e.g., posting) his or her production decisions using the button 1204. On the server side, the form from the station 2040 is funneled to a cgi-bin or the like and processed by a conventional form processing software.

The central computer 2010 evaluates the designs posted by the students using a multipeaked value function, as at step 2110. The central computer outputs at step 2120 marketplace performance data to each student with respect to their respective designs. The marketplace performance data is communicated from the central computer over the communication lines 2050 to the stations 2040 and, more particularly, to the station which posted that particular design in the first place. Meanwhile, the designs of all students can be provided across communication line 2030 to the main station 2020 so that the instructor can review and monitor progress in the designs as the simulation proceeds. The central computer records in a memory each of the designs it obtains from the various stations 2040 along with the value computed by the multipeaked value function for the present round, as at step 2130.

Next, a determination is made as to whether the simulation is to continue, at step 2140. This simulation can continue for a predetermined number of rounds or until other predetermined criteria are satisfied. For example, a simulation may continue (1) until a set number of firms has gone bankrupt, (2) a certain number of rounds after a radical innovation was introduced into the marketplace, or (3) based on other criteria. In the event that the simulation is to continue, then, optionally, the multipeaked value function and/or the number of attributes and/or the domains of one or more attributes can be altered to simulate exogenous shifts in the marketplace. For example, when the multipeaked value function is altered, then the values for all objects in the simulation are affected. As another example, when the number of attributes and/or the domains of one or more attributes are altered, the simulation models the discovery of the new product, a shortage of raw materials, or government regulation.

At step 2160, the system obtains at step 2160 revised designs from the students along with other data respecting the simulation such as requests for reports, surveys, advertising budgets, budget allocations, revised production schedules, royalty payments, and the like. This information is obtained by posting a form as described above in connection with step 2100. The process flow then loops back to step 2110 and repeats so that the revised designs can be evaluated using the (optionally altered) multipeaked value function, with the results being output to the students and recorded at the central station.

In the event that the simulation is not to continue further, as tested at step 2140, the process flow instead branches to step 2180 at which step each student's design is automatically evaluated relative to predetermined criteria, as stated above.

Figure 22:
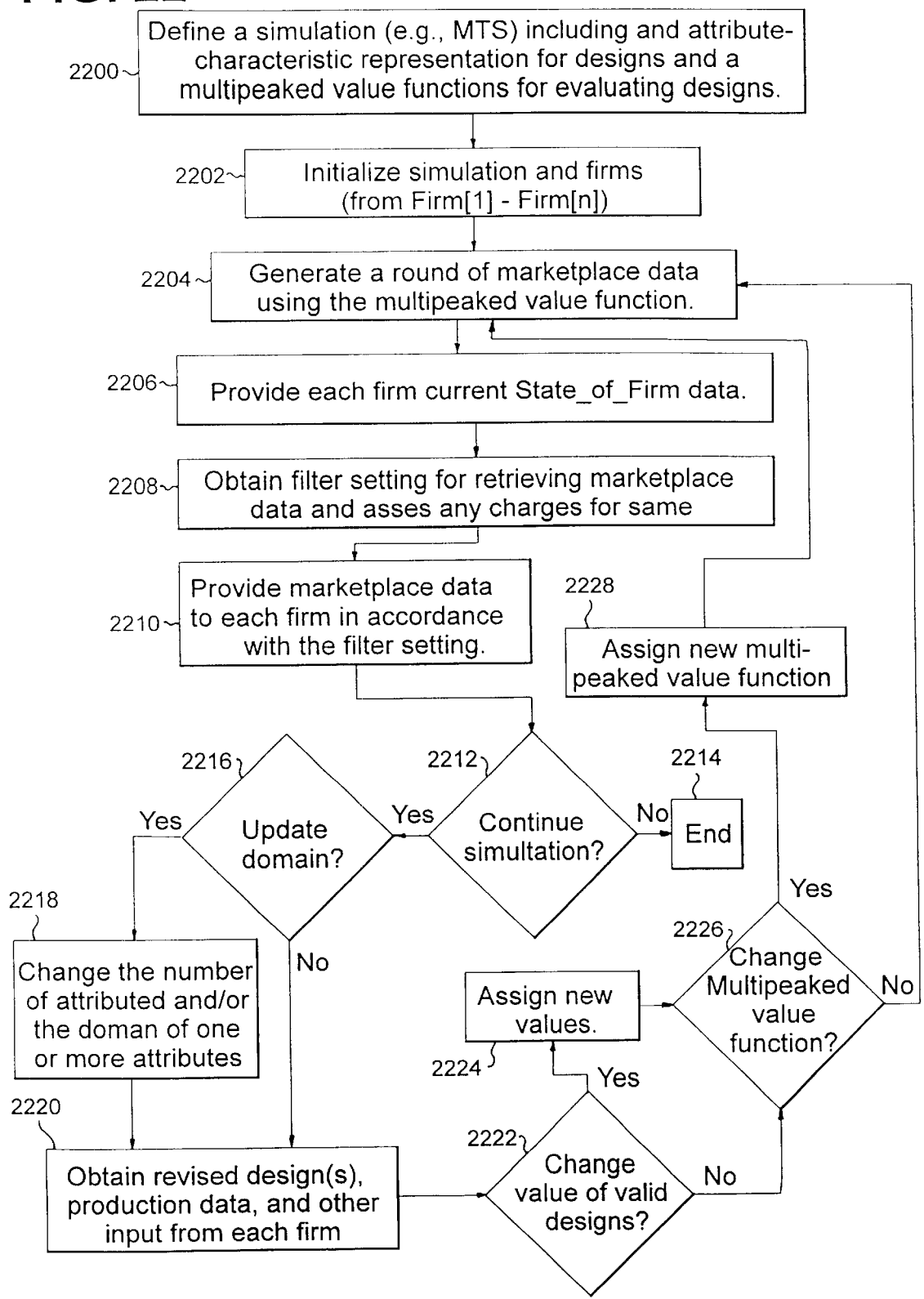
FIG. 22 illustrates a process flow for developing the decision-making skills of a user or for representing changes in design opportunities.

Turning now to FIG. 22, a process flow for developing the decision-making skills of a user or for representing changes in design opportunities is illustrated. At step 2200, a simulation such as a management training simulation is defined which includes an attribute characteristic ii representation for designs (e.g., products) and a multipeaked value function which is used for evaluating the design. In a preferred application, the designs are products that are to be sent to market by competing firms in a competitive business simulation.

At step 2202, the simulation and firms are initialized, that is, the starting settings for firm [1], firm [2], . . . , firm [n] are established. The initial set up of a firm can be as shown in FIG. 12 in which there is an existing budget and existing products and capacity, or the companies can start with no products or capacity and thereafter choose which products to make within the rules of the simulation. At step 2204, the system generates a round of marketplace data using the multipeaked value function. At step 2206, the system (e.g., central computer 2010) provides each firm (e.g., station 2040) current state_of_firm data.

In accordance with a salient aspect of the present invention, the central computer receives from each station 2040 a filter setting which is used to guide the retrieval of marketplace data from the memory of the central computer. A filter setting can be provided by the participant by completing a form that includes the same type of information that is available through the marketplace data display shown in FIG. 11.

Briefly, with reference to FIG. 23, using the preferred embodiment as an example, a form for providing search queries of the marketplace is illustrated. First and second filters are illustrated, along with a submit button. The first filter includes product characteristics "QWE". A second filter includes the search criteria ">10" under the column labeled "Units Sold". The user can submit one or both of these filters to the central computer for accessing a limited set of data from a substantially larger database of marketplace performance data on particular product designs. If the marketplace data of FIG. 11 were the only data in the marketplace and the filters of FIG. 23 were applied to that database, several different data looks could result. If only filter 1 were used, then the marketplace data would return the information from the first and third rows of FIG. 11 because those two rows include the product characteristic string "QWE" in columns 2, 3, and 4, respectively. On the other hand, were filter 2 used against the data in FIG. 11, then the data in rows one and two would be obtained because the number of units sold in those two rows exceed 10. Thus, a student entering in the first filter would obtain different information about the product space than a student who entered in filter two, and a student who entered in filters one and two would obtain yet a different set of information about the marketplace. Marketplace performance data that can be obtained includes, but is not limited to: the number of units that were sold in the marketplace, the market share, the market ranking, and price information. The data retrieved from the marketplace data preferably requires an expenditure from the firm's budget, and the user must decide how much to spend for marketplace performance data. Thus, for example, each filter may be associated with a separate charge, or each interrogation of the marketplace performance data may have a set charge.

Provided that the firm submitting the filter setting has sufficient finds (see budget 1201), then it will be provided with marketplace data in accordance with that filter setting at step 2210. Thereafter, a determination is made at step 2212 as to whether the simulation is to continue, substantially as described above in connection with step 2140 of FIG. 21. If the simulation has reached its conclusion, then the process flow ends as at step 2214. Otherwise, the simulation continues at step 2216 by determining whether the domain of the attribute-characteristic representation is to be updated. Updates to the domain include either a change in the number of attributes, a change in the domains of one or more attributes, or both. Any such change, which is effected at step 2218, causes the product space to either be expanded or contracted, depending on whether the relevant parameter is being increased or decreased.

Regardless of whether the domain is updated, the process continues at step 2220 by obtaining from the user revised designs, production data, and other input from each firm, that is, from use station 2040. At step 2222, a determination is made as to whether a change in the value of any of the valid designs is appropriate. Such a change can reflect, for example, an exogenous shift in the product space such as a change in consumer preferences or inflation. In accordance with a feature of the invention, the central computer 2010 includes system-set attributes in the attribute-characteristic representation of the set of valid object designs. The system-set attributes can exhibit strong frustration with other attributes that are alterable by the user. When the system-set attributes are changed, the overall value of the product is impacted. This is manifested in the simulation as sudden change in the value of the object versus the value prior to the change. If the value is to be changed, then the system-set attribute is altered, and new values are assigned at step 2224.

Also, regardless of whether there is change in the value, a determination is next made at step 2226 as to whether the multipeaked value function itself is to be changed for a subsequent round. In some simulations, it may be desirable to utilize a different multipeaked function than an initial one, for example, a new function derived from the first multipeaked function. In such a simulation, a new function is assigned at step 2228. Regardless of whether such a new function is assigned, if the simulation is to continue, as was determined at step 2212, then a new round of marketplace data is generated using the present or current multipeaked value function, as described above in connection with step 2204. The process flow then proceeds as previously described, round-after-round, until an end of simulation condition is satisfied.

From the foregoing, it should be appreciated that a result of changing the domain of one or more attributes is that the set of valid designs for the object is altered. If the domain of a particular attribute is expanded to include additional characteristics, then the product space is likewise expanded. As a specific example, a manufacturing plant may have had resources to paint cars blue, red or white. As a result of a new source of paint, however, the plant can now produce cars that are yellow. If the cars at the plant were defined by attributes, one for transmission (standard or automatic), another for air conditioning (yes or no), and one for color (red, blue or white) then the product space would be increased from 12 possible product designs to a total of 16 possible product designs by the introduction of the new color.

It should be understood that the set of valid designs can also be changed by increasing or decreasing the number of attributes in an attribute characteristic representation of the object. For example, the innovation of air conditioning could be added as a new attribute to an existing product line. Thus, in the preceding example, if cars of various colors and one of two transmission types comprised the set of valid designs, the introduction of the new attribute (air conditioning or no air conditioning) would double the set of valid designs.

The affect of either of these changes is to represent changes in design opportunities in the simulation. Just as the number of attributes or set of characteristics for a given attribute can be increased, they can likewise be constrained or decreased. Such a change simulates the affect of government regulation, a shortage of supplies, a natural disaster, and the like. In a preferred embodiment of the invention, such changes are automatically initiated by the central server. For example, the domain of one or more attributes or the number of attributes in the attribute-characteristic representation of the object can be changed automatically in response to a determination of the amount of innovation in the designs being submitted by participants in the simulation. Thus, if the designs that are being submitted to the system for processing by the multipeaked value function are approaching maximum values, or not changing substantially from round-to-round, then the system can automatically increase either the number of attributes that can be used to define the objects or introduce new characteristic possibilities that the participants can use to improve their respective designs and attempt to capture greater and greater market share.

In the event that the domains or attributes are changed, the value of each valid design in the product space preferably remains unchanged. The value of each design would be affected, however, if the multipeaked value function were changed or if a system-set characteristic were varied, that is, if a characteristic is changed by the system rather than the user. For example, if the simulation is modeling the beginning of an inflationary period, then a characteristic can be changed by the central server to reflect the new level of inflation. If this system-set characteristic exhibits strong frustration with other variables in the attribute-characteristic representation, then the overall value of many, if not all, of the designs in the product space will be affected.

A management training system that can be used to implement the method of the present invention preferably includes a first computer having a processor and a memory and a network connection to a plurality of stations such as the arrangement shown in FIG. 20. The first computer (e.g., a central server) is configurable to define a simulated business situation and to process inputs from the user (e.g., stations 2040) using the multipeaked value function as described above. Each of the stations connected to the first computer executes an application software program which preferably permits the user at the station to produce one or more objects and to submit such objects to the first computer. Each of the objects has a design which is defined using attribute-characteristic representation. Each of the stations is connected to the first computer via a connection which permits the inputted object designs to be forwarded to the first computer. The connection also permits information concerning the object designs that are processed at the first computer to be transmitted back from the first computer to the plural stations. Preferably, the first computer can identify each of the plural stations and transmit to each specific or particular station information concerning a current state of the user's designs.

Although the present invention has been fully described by way of example with reference to the accompanying drawings, it is to be noted here that various changes and modifications will be apparent to those skilled in the art. Therefore, unless such changes and modifications depart from the scope of the present invention, they should be construed as being included therein.

GLOSSARY

Key terms are listed in alphabetical order.

"#"

The number sign is used to create a compact notation for object categories. When displayed as a product attribute, the number signs signifies the entire range of object characteristics.

Aggregate Traits

Aggregate traits describe qualities of an entire product such as 'quality', 'reliability', 'durability', and 'value'. Aggregate traits are valued with a numerical scale.

Attributes

Attributes are the types of features of a product's design such as physical qualities, components, and abilities. Attributes can vary qualitatively, quantitatively, or in more complex ways (e.g., dual varying attributes). An attribute is a variable and its characteristics (see below) comprise the domain or set of possible instantiations for the attribute.

Attribute-Characteristic Representation

A method of representing the design of an object as a collection of attributes. Each attribute expresses one characteristic from a set of potential characteristics.

Business Process Traits

Business process traits describe the qualities of products that arise from business processes, such as customer service and delivery delay.

Characteristic (Product Characteristic)

Characteristics are the instantiation possibilities that an attribute can express. A characteristic of the "color" attribute can be the set of "blue," "green," . . .

Competitive Industry MTS

A competitive industry MTS is an MTS where one or more firms compete in a simulated marketplace.

Core Competency

A core competency is a strong capability of a firm. They permit a firm to differentiate its products from its competitors' products. This differentiation can be an important source of competitive advantage and profit. In the prior art students develop core competencies by heavily investing in a particular product trait. In the new method, students develop core competencies by discovering product categories with highly valued products and learning how these product categories correlate with other product categories.

Correlation

Correlation is a statistical property relating information about one area of the product space (a particular design or a product category) to other areas of the product space. It measures how well the values of the products in one area can predict the values of the products in other areas.

Demand Function

A demand function is an equation or set of equations that receives as its inputs (independent variables) decisions and outputs (e.g., products and/or advertisements) of a firm and determines sales of that firm's outputs.

Design Restrainer

A design restrainer adjusts the domain of product attributes and the number of product attributes in order to manipulate the set of valid product designs. The design retrainer can be an automated routine responsive to predetermined conditions or rules, or may be a person such as an administrator or simulation manager.

Distance Between Products

The distance between product measures the amount that two products differ. For example, for qualitatively varying attributes one might use a count of the number of attributes expressing different characteristics as a calculation of the distance between the products. Similarly, for example, for quantitatively vary attributes one might apply the mathematical calculation of difference to the attributes displaying different characteristics and then use this measure to calculate the distance between the products.

Distance Value Function

A distance value function is a function that assigns value as a monotonically decreasing function of the distance between a product and an ideal product. Distance value functions do not model frustration. They are single peaked.

Demand Elasticity

The demand elasticity is a number describing the percentage change in demand for one percent change in a factor that influences demand (for example, the price of a product). Demand elasticities can be calculated for industry demand (for example, how an industry's demand varies with the price of a product) and for firms (for example, how a firm's demand varies with the price of a product).

Design (Product Design)

The specific characteristics expressed by a product's attributes constitute a product's design.

Domain

As used herein, is the set of possible characteristics an attribute can express.

Endogenously

'Endogenously' denotes that a property or event arises from the actions of students using an MTS. For example, the product categories that students focus upon when designing innovations are determined by students during the learning session. Because they arise from within the MTS, during a learning session, they are endogenous Exogenously 'Exogenously' denotes that a property or event is defined by the construction of the MTS. For example, in a prior art MTS, the relationship between investment and the probability of an innovation is given by the probability distributions built into the MTS. This relationship, therefore, is determined exogenously. In MTSs built with the new technology, the function relating investment to innovation depends upon a student's knowledge and decisions. This depends upon the student's use of the MTS and evolves throughout the learning session. In new technology MTSs the relationship between investment and innovation is not exogenous, but endogenous.

Firm

A firm is a company that competes in the simulated competitive industry. A student learning with an MTS manages a firm. Some MTSs also include firms managed by the computer.

Frustration and Strong Frustration

Frustration exists when changing the characteristic expressed by one attribute (1) increases the contribution that the attribute makes to product value while simultaneously (2) decreasing the contribution to product value made by other attributes. When the result of frustration is a decrease in the value of the product, it is called strong frustration.

Ideal Product

The ideal product represents the product design most preferred by customers. Prior art MTSs use an ideal product to evaluate the designs of products that students send to the marketplace.

Information Reliability

The reliability of information measures how well information about the value of a product or product category predicts the value of other products or product categories. It is given by the appropriate correlation measure.

Information Theory

Information theory is a mathematical investigation of communication that defines communication signals and information with mathematically rigorous definitions. It is useful for calculating the amount of information produced by a marketplace and the amount of information utilized by a student.

Interaction

An interaction occurs when the characteristic expressed by one attribute influences how a characteristic by another attribute contributes to a product's value. When this occurs, the first attribute interacts with the second attribute.

Interface

The interface provides the student with a method of communicating with the MTS. It translates the simulated business situation results into business language and translates a student's decision into computer code.

Learning Session

A learning session refers to time during which a student uses an MTS.

Management Training Systems

Management training systems are computer programs used by students (usually managers and aspiring managers) for learning and practicing management. A management training system simulates a sequence of realistic decision situations. The student responds to each situation with a decision. The management training system calculates the result of the decision and displays it for the student.

Market

A market is a collection of customers that evaluate, and possibly purchase, the products produced by firms.

Market Manipulator

A market manipulator is a structure in an MTS that contains the demand functions and calculates the sales of products in a simulated market using these functions.

Market Segment

A market segment is a collection of customers within a market who share a preference for a distinctive set of product traits.

Marketplace

The marketplace is the part of an MTSs' computer program that determines the sales of products. Its simulates a real 'marketplace' where firms and customers meet to trade.

MTS

MTS is an abbreviation for management training systems.

Multipeaked Valued Function

A multipeaked is a value function that has multiple optima and has as its domain all products or objects in the simulation.

Perspective

A perspective is a set of product categories that a student uses to select information from the marketplace results to use for the purposes of decision making.

Product

Products have specific instantiations of each attribute in the attribute-characteristic representation. For example, if $a_1=\{0,1\}$, $a_2=\{0,1\}$, and $a_3=\{0,1\}$ then three examples of products are (001), (101), and (110). Products may take the form of devices, services, advertisements, and other objects that define outputs of a firm. The value obtained by the product evaluator 803 for a given product is used by the market manipulator 802 to determine a firm's sales of that product. If the product is a device then the sales are the sales of the device. If the product is an advertisement, then the sales, of course, are sales of some product or service, the performance of such sales in the marketplace being a direct reflection of the value of the advertising campaign.

Product Class

A product class is the set of products consisting of all possible values of a product's traits. A product's traits typically include factors in addition to attributes as used in the attribute-characteristic representation.

Product Category

In the present invention, a product category is a set of products defined upon the appearance or absence of product characteristics in a product's design. Students define product categories throughout a learning session. For example, one product category can be all blue products and another can be all non-blue products. In formal terms, a product category can be narrowly defined to be coextensive with a single product (e.g., (111) from the example used in the definition of "product" above) and broadly defined to be coextensive with the entire product space (e.g., (###) from the example used in the definition of "product" above). Ordinarily, product category is defined between these extremes.

Product Evaluator

A product evaluator is a structure in an MTS that evaluates product designs.

Product Space

A product space is a multidimensional space of products with a distribution of product values over this space. For the purpose of illustration, it is often useful to visualize a product space as in two dimensional space, a Cartesian coordinate system.

Product Traits

Product traits describe products. There are three types of product traits: business process traits (describing the outcome of business processes, such as delivery delays), aggregate traits (describing the whole product, such as quality), and attributes (describing specific features of a product, such as color).

Product Value Function

This is a function that takes a product's design as its input (independent variable) and determines the product's value.

Project

A project is a student's exploration and exploitation of the products in a product category hypothesized by the student.

Reinventing a Firm

Reinventing a business is a term that signifies a firm replacing its core business with a new business that requires new knowledge. Examples of firms reinventing their business are IBM switching from electric typewriters to computers and Motorola switching from car radios to integrated circuits.

Similarity

Similarity is a measure of the distance between two products (see definition of "distance between two products").

Student

A student refers to a person who is using an MTS.

Supply Curve

The supply curve is a function relating the amount of products produced by an industry to the cost of product inputs, such as labor and raw materials.

Topography of the Product Space

The topography of a product space describes how product values vary over the products in the product space.

Union of Two Sets

The union of two sets is a large set composed of the elements of the two sets.

Valid Product Design

A product design having a set of attributes within the attribute-characteristic representation, each attribute expressing one characteristic from the respective domain of such attribute.

Value (Product Value)

Value denotes the level of a product's value trait.

Closing Remarks Concerning the Prior Art Method of Modeling for Innovation and Technological Advance and for Accounting for Product Design Innovation In prior art MTSs, innovation either (1) increases the value of an aggregate trait, (2) expand the domain of attributes, (3) increase the number of attributes, or (4) adds an entirely new market to the learning session. Regardless of which effects are included, prior art MTSs use a variation of the following method to simulate innovation: For an example see: Thomas Pray and David Methe, "Modeling Radical Changes in Technology within Strategy-Oriented Business Simulations," *Simulation and Gaming*, vol. 22 (March 1991): pp. 19–35. Firms attempt innovation by allocating capital to 'research and development'. The allocation purchases a draw from a probability distribution. If the draw exceeds a predetermined threshold, the firm innovates. With this method, students have limited influence over the probability distribution and threshold parameter. The most potent means of influence is investment in research and development. Greater investment increases the probability of innovation.

The prior art method is quite flexible. The frequency of innovation, variation of innovative ability among firms, and firm and industry leaning curves, can all be modeled by adjusting the distribution and the threshold parameter. These capabilities make the method adequate for adding innovation to MTSs in which innovation is not an important aspect of the MTS (for example, MTSs that teach basic accounting, finance, and marketing in established markets). While useful in such MTSs, the prior art method of modeling innovation is inadequate for MTSs in which innovation is an important aspect (for example, MTSs that teach the management of innovation, technological advance, or knowledge). For such MTSs, the prior art is deficient for several reasons. These are:

1. The samples for the probability distribution simulate the outcome of the innovative process. The prior art method does not model the innovation process itself.
2. The method of sampling from a probability distribution does not represent or account for the influence of information, knowledge, or decision making in the innovation process. All these qualities, and all other qualities of the innovation process, are subsumed within the probability distribution and threshold parameters.
3. The probability distributions and threshold parameters are defined exogenously by the MTS designer or administrator. These constructs are not endogenously related to the information produced by the marketplace or to students' knowledge and decisions.

Technological Advance

In some prior art MTSs, technological advance is synonymous with innovation and represented in the same manner. These MTSs suffer from the deficiencies listed above. In other prior art MTSs, technological advances are simulated by introducing new probability distributions for representing innovation. This method is also has limitations: It only simulates a small number of new opportunities: those specified by the new probability distributions, whereas real technological advances create a multitude of opportunities. Because of this deficiency, prior art MTSs cannot provide students with practice in managing a firm through technological change. Moreover, because of this limitation, the prior art MTSs cannot properly simulate the market dynamics that follow a technological advance (such as industry life cycles).

The Product Value Function

The prior art calculates a product's value by comparing each product to an ideal product. The ideal product is the product design that customers like best. The ideal product is set at the start of a learning session. If there are multiple markets or market segments, each has its own ideal product. In order to calculate a product's value, the prior art uses an equation that measures a product's similarity to the ideal product. This equation quantifies the notion of similarity into a number called the distance between a product and the ideal product. For this reason, I call the prior art method a "distance value function".

For examples of prior art product value functions, see: Richard Teach, "Demand Equations for Business Simulations with Market Segments," *Simulation and Gaming*, vol. 21 (December 1990): pp. 423–442 and Steven Gold and Thomas Pray, "Technological Change and Intertemporal Movements in Consumer Preferences in the Design of Computerized Business Simulations with Market Segmentation," *Developments in Business Simulations and Experiential Exercises*, vol. 25 (1998): pp. 156–167.

Utilizing this method, product value is a monotonically decreasing function of the distance between two products. Products that have small distances (similar to the ideal) have higher values. Products that have large distances (dissimilar to the ideal) have lower values. This result arises because the distance functions do not represent frustration. The formula for calculating the distance between two points provides an example. Suppose a product class has four quantitative attributes. In prior art MTSs, the distance between a product and the ideal might be calculated as $DISTANCE=(d_1^2+d_2^2+\ldots+d_n^2)^{0.5}$, where $d_i=(I_i-a_i)$ and $I_i$ and $a_i$ represent the characteristics expressed by the $i^{th}$ attribute for the ideal product and a product produced by the student. By taking derivatives one can show that when the value function decreases monotonically with distance (1) an improvement in design in one dimension can never cause a decrease in the value of a product (i.e., no strong frustration) and (2) that the value function has only one optimum, which occurs when $d_1=d_2=\ldots=d_n=0$.

The mountain range metaphor helps to illuminate the qualities produced by this method. Because the distance value functions lack frustration, the product space topology of the prior art MTSs are Mount Fuji-like. The topology has a single peak that stands directly over the ideal product. As products becomes less like the ideal, their design quality decreases, producing broad, gradual slopes. This topology, has significant consequences, including:

1. The characteristic expressed by an attribute in the ideal product remains the best characteristic for that attribute to express (at least as good as any other characteristic) regardless of the characteristics expressed by other attributes. Because of this, a student can address each attribute independently.
2. By making a series of small changes in a product's design, a student can produce a sequence of designs such that (1) each subsequent design increases product quality and (2) the sequence ends with the ideal product. Moreover, this property holds regardless of the order in which a student addresses the attributes.

These qualities do not exist in the present invention described in the foregoing specification. The strong frustration exhibited by multipeaked value functions prevents students from addressing each attribute independently. The strong frustration also prevents students from finding the optimal product via a sequence of products that (1) differ by incremental design changes and (2) produce a monotonically increasing sequence of product values. In the present inventive system and method, continuing improvement in product design eventually must require a more radical change in product design. Metaphorically, the product space topology of the present invention is multipeaked, as opposed to single peaked. Improving a product design that resides beneath the peak of a smaller mountain requires a simultaneous change of several product characteristics; one must travel to a different, taller mountain.

There is another significant quality of the prior art (and one that distinguishes the present system and method from the prior art). This distance value function creates a highly correlated product space. Information about the value of products provides considerable information about other products. The Mount Fuji topology illustrates this property. Once a student discovers the direction of design changes that 'climbs' the mountain, the student knows a great deal about the entire topology of the product space. This differs from the new method where information is correlated over small areas of the mountain range (among sets of incremental innovations) but uncorrelated across larger areas (areas containing radical innovations).

Some makers of prior art MTSs recognize that the prior art method produces highly reliable information. As a remedy, some prior art MTSs add a random error term to the marketplace information (for example, to the information found in a marketing report). The difference between this modeling of uncertainty and the present invention is significant. The prior art adds informational uncertainty exogenously. In the new method, information reliability arises endogenously and produces the proper relationship between information reliability and innovation. Moreover, the problems of the prior art method are compounded by another practice of the prior art: making the reliability of information vary with investment in marketing research. For an example of this, see: Thomas Pray and David Methe, "Modeling Radical Changes in Technology within Strategy-Oriented Business Simulations," *Simulation and Gaming*, vol. 22 (March 1991): pp. 19–35. More expensive marketing reports have more reliable information. In these MTSs, the reliability of information is a function of investment. In the new method, the information's reliability is, appropriately, a function of innovation and perspective.

Because distance value functions exhibit the qualities just described—(1) addressing the attributes independently; (2) optimizing of product value via a sequence of small changes in design that each improve value; and (3) highly correlated—they are suitable only for teaching the management of low uncertainty situations. These situations include, for example, pricing, designing, positioning, and promoting products in established markets (i.e., basic marketing). Prior art MTS largely are not suitable for teaching the management of high uncertainty situations. These situations include, for example, entrepreneurship, developing new core competencies, developing radical innovations, managing technological change, and reinventing one's business.

Finally, it should be noted that the prior art does not provide a method for measuring information and knowledge; relating these measures to the product space topology; or relating these measures to students' decisions. Furthermore, the prior art cannot relate the tasks demanded of students to cognitive functions. Because of these limitations, the prior art cannot usefully illuminate and analyze the role of knowledge and information in students' decisions, marketplace competition, and the simulated industry's dynamics. Moreover, for the same reasons, the prior art must teach through an indirect method, where students test a variety of ideas and, hopefully, induce an improved understanding of management. The prior art cannot teach through the direct method previously described.

What is claimed is:

1. A method implemented on a computer for representing changes in design opportunities in a management training simulation, comprising the steps of:
   a) providing an attribute-characteristic representation of one or more objects;
   b) processing said objects with a multipeaked value function; and
   c) changing at least one of a domain of one or more attributes and the number of attributes of the attribute-characteristic representation by removing restrictions on the valid object designs in the attribute-characteristic representation during the course of the management training simulation, whereby a set of valid designs for said objects in the management training simulation is altered.

2. The methods as in claim 1, wherein only the domain of one or more of the attributes is changed.

3. The method as in claim 2, wherein the changing step includes the step of expanding the domain of one or more attributes in the attribute-characteristic representation that the user can vary in order to simulate a technological advance.

4. The method as in claim 1, wherein only the number of attributes is changed.

5. The method as in claim 4, wherein the changing step includes the step of expanding the number of attributes in the attribute-characteristic representation that the user can vary in order to simulate a technological advance.

6. The method as in claim 1, wherein the changing step is automatically initiated in response to a determination of the amount of innovation in the processed object designs.

7. The method as in claim 1, wherein a value of each valid design of said objects remain unchanged after the changing step.

8. The method as in claim 1, including the additional step of obtaining object designs for said objects from a user prior to the processing step.

9. The method as in claim 8, including the additional step of selectively providing the user with information concerning at least a subset of said set of products.

10. The method as in claim 9, including the additional step of charging the user for the provided information.

11. The method as in claim 9, wherein the step of selectively providing the user with information includes providing marketplace information that satisfies a search query entered by the user.

12. The method as in claim 1, wherein the multipeaked value function exhibits strong frustration between at least two attributes.

13. A method implemented on a computer for representing changes in design opportunities in a management training simulation, comprising the steps of:
   a) providing an attribute-characteristic representation of one or more objects;
   b) processing said objects with a multipeaked value function; and
   c) changing a domain of one or more attributes of the attribute-characteristic representation, whereby a set of valid designs for said objects in the management training simulation is altered,
      wherein the changing step includes the step of constraining the domain of one or more attributes in the attribute-characteristic representation that the user can vary in order to simulate government regulation or a shortage of raw materials.

14. A method implemented on a computer for representing changes in design opportunities in a management training simulation, comprising the steps of:
   a) providing an attribute-characteristic representation of one or more objects;
   b) processing said objects with a multipeaked value function; and
   c) changing the number of attributes of the attribute-characteristic representation, whereby a set of valid designs for said objects in the management training simulation is altered,
      wherein the changing step includes the step of constraining the number of attributes in the attribute-characteristic representation that the user can vary in order to simulate government regulation or a shortage of raw materials.

15. A method implemented on a computer for effecting changes in object design values in a simulation, comprising the steps of:
   a) providing an attribute-characteristic representation having attributes that are representative of one or more objects and at least one disturbance-attribute that is representative of a factor that influences the simulation;
   b) processing said objects with a multipeaked value function; and c) the computer automatically changing a system-set characteristic of the disturbance-attribute in the attribute-characteristic representation of the set of valid object designs, whereby one or more values of said set of valid object designs in the simulation is altered.

16. A method for diagnosing the cognitive approach of a student in responding to a design evaluation presented on a computer, comprising the steps of:

a) commencing a first round by obtaining from the student at least one of an object design and an object category that includes one or more object designs, each object design that is obtained from the student being represented by an attribute-characteristic representation;

b) evaluating the designs in the computer using a multipeaked value function;

c) outputting a value concerning the designs obtained from the student;

d) commencing a further round by obtaining a revised design for the one or more objects;

e) repeating steps b) through d) a number of additional rounds while recording each obtained design; and f) comparing the value of the designs of the student to other data to gauge the student's cognitive approach, in each round, in revising the design.

17. The method as in claim 16, wherein the repeating step further includes recording the value for each of the designs and associating the value and the design in a memory of the computer.

18. A management training system, comprising:

a) a first computer including a processor and memory and a network connection to a plurality of stations, the first computer being configurable to define a simulated business situation and to process inputs from users using a multipeaked value function;

b) a plurality of stations connected to the first computer and executing an application software program which permits a user at each station to design one or more objects thereat, each object having a valid object design defined using an attribute-characteristic representation; and c) a connection between the plurality of stations and the first computer which permits object designs input at the plural stations to be forwarded to the first computer and permits data concerning the object designs that have been processed using the multipeaked value function to be transmitted from the first computer to the plural stations, wherein the application software program is changeable by removing restrictions on the valid object designs in the attribute-characteristic representation during the course of the simulated business situation to increase the number or domain of the valid object designs defined by the attribute-characteristic representation.

19. The system as in claim 18, wherein each station is identifiable by the first computer and wherein the first computer is configured to transmit to each particular station information concerning a current state of the of that user's object designs.

* * * * *